US009152524B2

(12) United States Patent
Takeuchi

(10) Patent No.: US 9,152,524 B2
(45) Date of Patent: Oct. 6, 2015

(54) BUS MONITOR CIRCUIT AND BUS MONITOR METHOD

(75) Inventor: Toshiki Takeuchi, Tokyo (JP)

(73) Assignee: NEC Corporation, Tokyo (JP)

(*) Notice: Subject to any disclaimer, the term of this patent is extended or adjusted under 35 U.S.C. 154(b) by 487 days.

(21) Appl. No.: 13/511,559

(22) PCT Filed: Nov. 24, 2010

(86) PCT No.: PCT/JP2010/070874
§ 371 (c)(1),
(2), (4) Date: May 23, 2012

(87) PCT Pub. No.: WO2011/065354
PCT Pub. Date: Jun. 3, 2011

(65) Prior Publication Data
US 2012/0246369 A1    Sep. 27, 2012

(30) Foreign Application Priority Data

Nov. 26, 2009    (JP) ................................ P2009-268809

(51) Int. Cl.
*G06F 3/00*      (2006.01)
*G06F 5/00*      (2006.01)
*G06F 13/00*     (2006.01)
*G06F 11/30*     (2006.01)

(52) U.S. Cl.
CPC ........ *G06F 11/3027* (2013.01); *G06F 11/3089* (2013.01)

(58) Field of Classification Search
USPC ..................................... 710/39, 52, 110, 112
See application file for complete search history.

(56) References Cited

U.S. PATENT DOCUMENTS 5,404,548 A * 4/1995 Nishioka ........................ 710/52
6,182,177 B1 * 1/2001 Harriman ..................... 710/112
(Continued)

FOREIGN PATENT DOCUMENTS

CN    101887398 B  *  8/2012  .............. G06F 12/08
GB      1483282 A  *  8/1977  .......... G06F 12/1491
(Continued)

OTHER PUBLICATIONS

International Search Report in PCT/JP2010/070874 dated Feb. 22, 2011(English Translation Thereof).
(Continued)

*Primary Examiner* — Faisal M Zaman
(74) *Attorney, Agent, or Firm* — McGinn IP Law Group, PLLC

(57) ABSTRACT

A bus monitor circuit includes an access info information/write data FIFO and a read data FIFO to produce a bus monitor output signal on a bus transmitting data between a master and a slave. In a write access ascribed to an attribute of the access information stored at a header of the access information/write data FIFO, the bus monitor circuit directly outputs a bus monitor output signal indicating the access information accompanied with the corresponding write data which is transmitted in the same cycle. In a read access ascribed to an attribute of the access information, the bus monitor circuit waits for the read data FIFO storing the corresponding read data, and then outputs a bus monitor output signal indicating the access information paired with the read data in the same cycle. This guarantees the occurrence order of bus access according to a bus interface protocol enabling pipeline transmission.

20 Claims, 13 Drawing Sheets

(56) References Cited

U.S. PATENT DOCUMENTS

| | | | |
|---|---|---|---|
| 6,272,589 B1 * | 8/2001 | Aoki | 711/112 |
| 6,286,070 B1 * | 9/2001 | Ohara | 710/113 |
| 6,374,244 B1 * | 4/2002 | Shibata | 1/1 |
| 6,405,329 B1 * | 6/2002 | Colligan et al. | 714/57 |
| 6,412,030 B1 | 6/2002 | Adusumilli | |
| 6,687,780 B1 * | 2/2004 | Garlepp et al. | 710/305 |
| 6,789,175 B2 * | 9/2004 | Ryan et al. | 711/151 |
| 6,851,011 B2 * | 2/2005 | Lin | 711/4 |
| 7,130,942 B2 * | 10/2006 | Gemelli et al. | 710/105 |
| 7,565,498 B1 * | 7/2009 | Baird et al. | 711/158 |
| 7,603,487 B2 * | 10/2009 | Jagathesan et al. | 710/8 |
| 8,145,809 B1 * | 3/2012 | Raza et al. | 710/58 |
| 2003/0065870 A1 | 4/2003 | Kawaguchi | |
| 2004/0044814 A1 | 3/2004 | Beaudoin et al. | |
| 2006/0047882 A1 | 3/2006 | Kawaguchi | |
| 2006/0212662 A1 * | 9/2006 | Ueda | 711/147 |
| 2007/0118675 A1 | 5/2007 | Kawaguchi | |
| 2008/0133814 A1 | 6/2008 | Kawaguchi | |
| 2009/0164692 A1 | 6/2009 | Kawaguchi | |
| 2012/0159016 A1 * | 6/2012 | Morita | 710/33 |
| 2012/0311209 A1 * | 12/2012 | Kothamasu et al. | 710/110 |
| 2013/0067130 A1 * | 3/2013 | Tazaki | 710/110 |
| 2014/0281057 A1 * | 9/2014 | Cohen et al. | 710/52 |

FOREIGN PATENT DOCUMENTS

| | | | | |
|---|---|---|---|---|
| JP | 56159886 A | * | 12/1981 | G11C 9/06 |
| JP | 2000-020345 A | | 1/2000 | |
| JP | 2000-330877 A | | 11/2000 | |
| JP | 2002-542539 A | | 12/2002 | |
| JP | 2003-122701 A | | 4/2003 | |
| JP | 2004-094945 A | | 3/2004 | |
| JP | 2006-107004 A | | 4/2006 | |
| JP | 2007-310516 A | | 11/2007 | |
| JP | 2007310760 A | * | 11/2007 | G06K 19/07 |
| JP | 2003-108514 A | | 6/2008 | |
| WO | WO00/63782 | | 10/2000 | |

OTHER PUBLICATIONS

Japanese Office Action dated Sep. 24, 2014 with a partial English translation.

* cited by examiner

BUS MONITOR CIRCUIT AND BUS MONITOR METHOD

TECHNICAL FIELD

The present invention relates to a bus monitor circuit and method that monitor bus access information in a signal processing device such as a processor, system LSI, and SoC (System on Chip). In particular, a bus monitor circuit and method of the present invention is based on a bus interface protocol enabling pipeline transaction and split transaction in a read mode.

The present application claims priority on Japanese Patent Application No. 2009-268809 filed Nov. 26, 2009, the entire content of which is incorporated herein by reference.

BACKGROUND ART

A signal processing device such as a processor, system LSI, and SoC is equipped with a bus monitor circuit that sends bus access information on a main bus inside a chip in an execution mode for the purpose of debugging and external observation outside a chip.

It is preferable that a bus monitor circuit can output bus access information (i.e. an address and control information) paired with data information in an order guaranteeing the occurrence order of bus access. Considering an output clock frequency and the number of external output pins used for externally outputting bus information to the outside of a chip, it is preferable that a large amount of bus access information can be sent using as a small number of bits as possible.

However, when a bus interface protocol enabling pipeline transaction undergoes the concurrent occurrence of a read access and a write access, the actual occurrence order of the read access and the write access may not match the transmitted order of read data (RDAT) and write data (WDAT). In this case, it is difficult to output bus monitor signals indicating bus access information paired with data information.

Due to a recent tendency in a large-scale and high-speed processor system, a bus interface protocol is evolved with an interface specification achieving high-speed access in terms of latency and throughput. In particular, for the sake of improving a throughput in read access, for example, a bus interface protocol enabling pipeline transaction and split transaction such as AMBA3.0AXI and OCP (Open Core Protocol) has been frequently used. In this bus interface protocol supporting pipeline transaction, a command generating order may be reverse to the transmitted order of read data and write data due to the concurrent occurrence of a read access and a write access.

In this case, a bus monitor circuit outputs bus monitor signals in the transmitted order of data information for the purpose of external observation outside a chip, whereas a bus access order is not guaranteed in bus monitor signals. With a bus monitor circuit outputting bus monitor signals that do not guarantee the occurrence order of bus access, it is impossible to obtain bus access information in the actual order of bus access that occurs inside a chip, and therefore it is impossible to conduct debugging with a high efficiency and a high reliability. Due to the nonguaranteed bus access order, it is impossible to provide bus access information paired with data information.

PLT 1 disclosed a technology that concurrently latches addresses, data, and attributes so as to store them in a memory in order to output minimum bus access information in a bus access order. In the technology of PLT 1, in a cycle completely validating an address, data, and an attribute, those elements matching a predetermined bus monitor condition are solely and concurrently latched so that the set of an address, data, and an attribute is stored at the same address in each memory; thus, it is possible to store minimum bus access information in a memory in a bus access order.

PLT 2 disclosed a technology that adopts a plurality of FIFOs to concurrently output bus monitor signals with respect to a plurality of buses. In the technology of PLT 2, a bus access suited to a filtering condition for each bus is solely stored in each FIFO while the stored data of a nonempty FIFO are sequentially outputted; thus, it is possible to efficiently output bus monitor signals with respect to bus access information on a plurality of buses.

PLT 3 disclosed a technology in which an access control circuit of a PCI bus including a write FIFO and a read FIFO is used to minimize nullification of read requests on the PCI bus. To cope with the existence of pending read requests, the technology of PLT 3 prevents or continues a write access using its target address, thus minimizing nullification of read requests.

CITATION LIST

Patent Literature

PLT 1: Japanese Patent Application Publication No. 2000-330877
PLT 2: Japanese Patent Application Publication No. 2007-310516
PLT 3: Japanese Patent Application Publication No. 2002-542539

SUMMARY OF INVENTION

Technical Problem

A bus monitor circuit adopting a bus interface protocol enabling pipeline transaction and split transaction, which is installed in a processor, system LSI, or SoC, is unable to output bus monitor signals in a bus access order guaranteeing the occurrence order of bus access.

This is because in a bus interface protocol enabling pipeline transaction and split transaction, the transmitting order of read data and write data on a bus may differ from the actual occurrence order of bus access. In this case, the foregoing bus monitor circuit is unable to output bus monitor signals in the occurrence order of bus access. That is, bus monitor signals output in a transmitted order of data information may not guarantee a bus access order when they are externally observed outside a chip. Due to a nonguaranteed bus access order in a bus monitor mode, it is impossible to obtain bus access information in the actual occurrence order inside a chip, and therefore it is impossible to conduct debugging with a high efficiency and a high reliability.

Additionally, a bus monitor circuit adopting a bus interface protocol enabling pipeline transaction and split transaction, which is installed in a processor, system LSI, or SoC is unable to produce bus access information, such as an address and a control signal, paired with the corresponding data information in the same cycle.

This is because a bus interface protocol enabling pipeline transaction and split transaction is unable to transmit bus access information and its corresponding data information in the same cycle, and therefore it is difficult to produce them paired together in the same cycle. Due to an inability to produce bus access information paired with data information, it is necessary to establish correlation between them being externally observed outside a chip; this may reduce a reliability of debugging.

Additionally, it is necessary to output bus monitor signals regarding a large amount of bus access information via the minimum number of bits so that write data and read data may necessarily share data bits of data information.

Thus, it is possible to achieve a highly reliable manner of debugging when bus monitor information is sent outside a chip such that bus access information is outputted using the limited number of external output pins for outputting bus monitor signals within an output clock frequency or when bus access information is stored in a bus monitor memory inside a chip such that a large amount of bus access information is stored using the limited memory capacity. Additionally, it is possible to reduce the number of external output pins, the number of output cycles, and the memory capacity since bus monitor signals can be rendered using a small number of data bits.

The technology of PLT 1 adopting a bus interface protocol enabling pipeline transaction is unable to cope with the situation in which the transmitting order of write data and read data differs from the issuing order of addresses or the nonexistence of a cycle completely validating an address, data, and an attribute, and therefore it is unable to output bus monitor signals in an order of bus address information.

The technology of PLT 2 adopting a bus interface protocol enabling pipeline transaction is unable to cope with the situation in which the transmitting order of read data and write data differs from the transmitting order of bus address information. When two bus transmissions such as read transmission and write transmission on a single bus are independently assigned to FIFOs, for example, it may be possible to store write/read data in FIFOs and externally output them, but it is impossible to guarantee the transmitting order between busses (or between a plurality of FIFOs) when data are sequentially transmitted from a nonempty FIFO; hence, it is impossible to guarantee a bus access order and to output bus monitor signals in order.

The technology of PLT 3 adopting a bus monitor circuit based on a bus interface protocol enabling pipeline transaction possibly nullifies read access which is essentially needed depending on conditions. Additionally, the technology of PLT 3 is designed to cope with a single write access, and therefore it cannot cope with two or more write accesses that occur in related addresses. Moreover, it is unable to cope with two or more read requests which are pending.

Considering the foregoing problems, the present invention aims to provide a bus monitor circuit and its method which is able to output bus monitor signals in order, guaranteeing the occurrence order of bus access and which is able to output bus monitor signals indicating bus access information paired with data information even when it adopts a bus interface protocol enabling pipeline transaction.

Solution to Problem

A bus monitor circuit of the present invention produces a bus monitor output signal on a bus transmitting data between a master and a slave, wherein it includes a first FIFO; a second FIFO that operates at a timing different from the timing of the first FIFO; a controller that controls the first FIFO and the second FIFO; and a selector that selects write data or read data. The controller sequentially stores access information, transmitted on the bus in a direction from the master to the slave, thereafter, the controller waits for an output enable state established with the first FIFO or the second FIFO, so that the controller controls the first FIFO or the second FIFO to output write data or read data in response to a write access or a read access specified by an attribute of the access information stored at a header of the first FIFO while controlling the first FIFO to output access information. Additionally, the selector selects write data or read data according to the attribute of the access information stored at the header of the first FIFO so as to output the selected data paired with the access information in the same cycle.

A bus monitor method of the present invention produces a bus monitor output signal on a bus transmitting data between a master and a slave by use of a first FIFO and a second FIFO which operate at different timings. This bus monitor method includes a process for sequentially storing access information, transmitted on the bus in a direction from the master to the slave, in the first FIFO; a process for waiting for an output enable state established with the first FIFO or the second FIFO and then for controlling the first FIFO or the second FIFO to output write data or read data in response to a write access or a read access specified by an attribute of the access information stored at a header of the first FIFO while controlling the first FIFO to output the access information; and a process for selecting write data or read data in accordance with the attribute of the access information stored at the header of the first FIFO, thus outputting the selected data paired with the access information in the same cycle.

Advantageous Effects of Invention

The present invention includes a first FIFO and a second FIFO which operate at different timings, wherein it controls the first FIFO and the second FIFO in response to an attribute of access information indicating a write access or a read access. Thus, it is possible to produce a bus monitor output signal guaranteeing the occurrence order of bus access in accordance with a bus interface protocol enabling pipeline transaction with a possibility that the transmitted order of write data and read data may be the reverse of the occurrence order of bus access. Specifically, when the access information stored at a header of the first FIFO indicates a write access, the present invention directly outputs a bus monitor output signal indicating the access information accompanied with write data which is transmitted in the same cycle. When the access information stored at the header of the first FIFO indicates a read access, it waits for the second FIFO storing read data and then outputs a bus monitor output signal indicating a pair of access information and read data in the same cycle. That is, the access information, which is stored in the first FIFO in accordance with the bus access occurrence order, is directly outputted in its original order and paired with the corresponding data information in a bus monitor output signal.

Additionally, when read data is transmitted on a bus in a cycle of write access specified by the access information stored at the header of the first FIFO, the present invention may include the access information, relating to the write access, in a bus monitor output signal while storing read data in the second FIFO. Thus, it is possible to produce a bus monitor output signal in accordance with the bus access occurrence order and to thereby prevent read data from disappearing.

Moreover, when the amount of bus access data, which sequentially occur, overflows the number of FIFO stages configuring the bus monitor circuit, the present invention may notify inconsistency between address information and data information by use of an error flag bit outside the chip. Thus, it is possible to discriminate between a bus monitor output signal with a high reliability and a bus monitor output signal with a low reliability outside the chip.

DESCRIPTION OF EMBODIMENTS

The present invention will be described in detail in conjunction with embodiments.

First Embodiment

Figure 1:
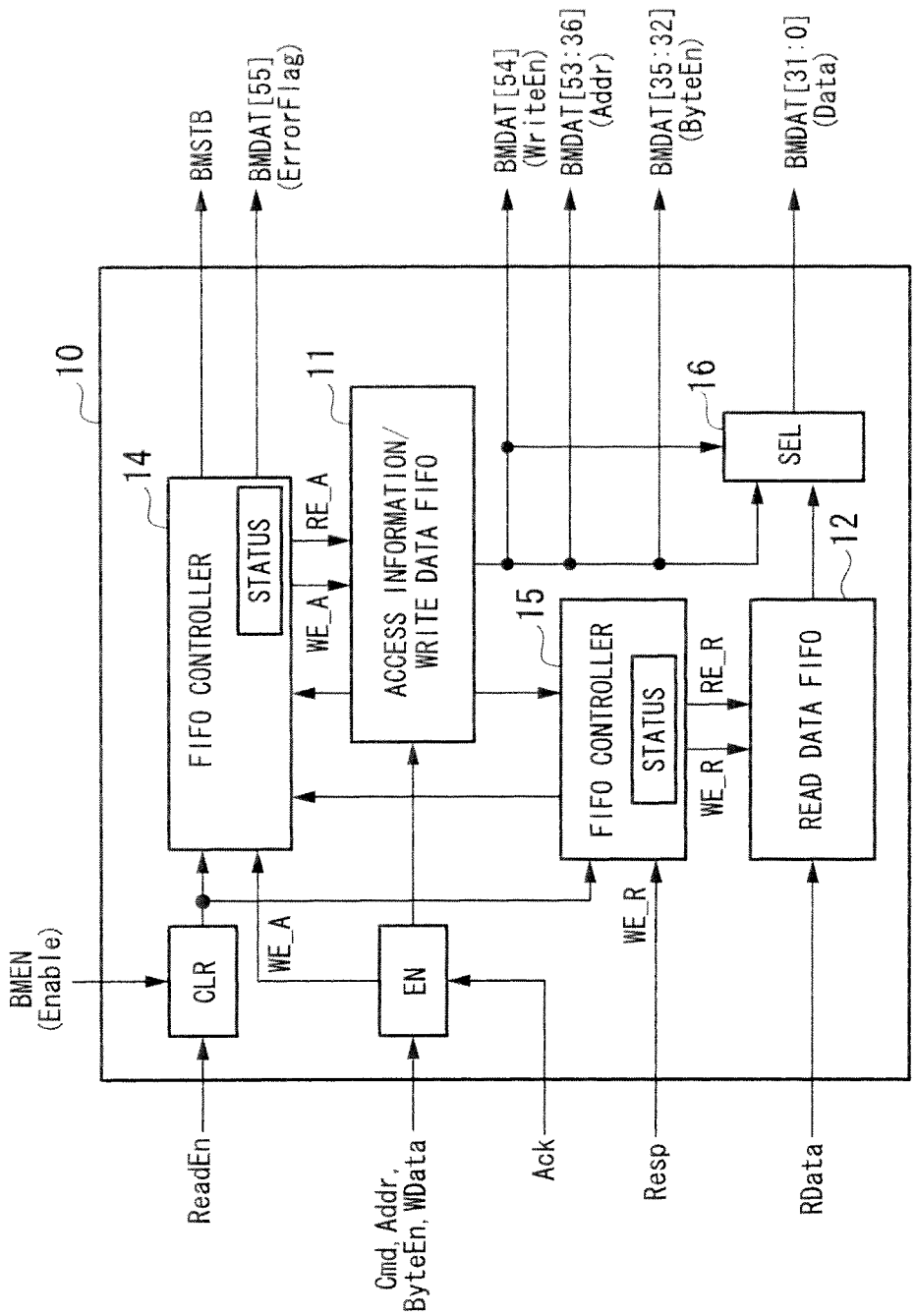
FIG. 1 A block diagram showing the constitution of a bus monitor circuit according to a first embodiment of the present invention.

FIG. 1 is a block diagram showing the constitution of a bus monitor circuit according to a first embodiment of the present invention. The first embodiment exhibits a bus monitor circuit that outputs bus access information in accordance with a bus interface protocol enabling pipeline transaction and split transaction in a read mode.

A bus monitor circuit 10 shown in FIG. 1 includes two types of FIFO (First-In-First-Out) parts, i.e. an access information/write data FIFO 11 and a read data FIFO 12. The access information/write data FIFO 11 stores access information, such as commands and addresses transmitted onto a bus being monitored, and write data which is transmitted in the same cycle as access information. The read data FIFO 12 stores read data which is transmitted in a cycle different from that of access information.

The bus monitor circuit 10 includes an FIFO controller 14 that controls the access information/write data FIFO 11, and an FIFO controller 15 that controls the read data FIFO 12.

The FIFO controller 14 outputs a write enable signal (WE_A) for controlling a write operation and a read enable signal (RE_A) for controlling a read operation with respect to the access information/write data FIFO 11. The write enable signal (WE_A) of the access information/write data FIFO 11 includes a command and an accept signal (Ack) indicating acceptance of write data and access information including the command on a bus. The read enable signal (RE_A) of the access information/write data FIFO 11 includes a status of the access information/write data FIFO 11, an access attribute (i.e. a write/read access) of data at a header of the access information/write data FIFO 11, and a status of the read data FIFO 12.

The FIFO 15 outputs a write enable signal (WE_R) for controlling a write operation and a read enable signal (RE_R) for controlling a read operation with respect to the read data FIFO 12. The write enable signal (WE_R) of the read data FIFO 12 includes a response signal (Resp) indicating completion of transmission of read data on a bus. The read enable signal (RE_R) of the read data FIFO 12 includes a status of the read data FIFO 12, a status of the access information/write data FIFO 11, and an access attribute (i.e. a write/read access) of data at a header of the access information/write data FIFO 11.

The bus monitor circuit 10 includes a data information selector (SEL) 16 in order to output a pair of data information and access information. The data information selector 16 outputs a pair of write data and access information in the case of a write access, while the data information selector 16 outputs a pair of read data and access information in the case of a read access.

The bus monitor circuit 10 outputs a command (Cmd), an address (Addr), a byte enable signal (ByteEn), and write data (WData), which are transmitted in a direction from a master side (or a processor side) to a slave side (or a memory side), via the access information/write data FIFO 11. On the other hand, it outputs read data (RData), which is transmitted from the slave side to the master side, via the read data FIFO 12. Additionally, the bus monitor circuit 10 outputs a bus monitor signal.

As signals transmitted onto a bus being monitored, the bus monitor circuit 10 shown in FIG. 1 receives a command (Cmd), an address (Addr), a byte enable signal (ByteEn), write data (WData), an accept signal (Ack), a response signal (Resp), and read data (RData).

The command (Cmd) represents an access attribute and a command for conducting a write access or a read access. The address (Addr) specifies an address of data in a write mode or a read mode. The byte enable signal (ByteEn) specifies an access area and a data size. The write data (WData) represents data that is written in a direction from a master side to a slave side. Herein, a command, an address, and a byte enable signal include data bits indicating access information, wherein they are extended by the number of bits corresponding to write data so that write data can be transmitted at the same timing as the access information.

The accept signal (Ack) is transmitted when the slave side, receiving a command from the master side, is set to an acceptable condition. The response signal (Resp) indicates a cycle in which read data is prepared. The read data (RData) is transmitted from the slave side to the master side. In addition to the foregoing signals, the bus monitor circuit 10 may receive a read enable signal (ReadEn) and a bus monitor enable signal (BMEn) that controls a bus monitor operation to start or stop by the external circuitry thereof.

The bus monitor signal includes a bus monitor strobe signal (BMSTB) and a bus monitor output signal (BMDAT). The bus monitor strobe signal (BMSTB) indicates a cycle validating the bus monitor output signal (BMDAT).

The bus monitor output signal (BMDAT) stores a plurality of pieces of information with the predetermined number of bits thereof. The following description refers to a bitwise configuration in a bus monitor output signal. The bitwise configuration shows an example of a sorted order of each piece of information; hence, it is possible to employ another sorted order. In this connection, the number in parentheses [ ] denotes the bit number.

BMDAT [55]: error flag (ErrorFlag)
BMDAT [54]: command, write enable (WriteEn)
BMDAT [53:36]: address (Addr)
BMDAT [35:32]; byte enable (ByteEn)
BMDAT [31:0]: access data The bus monitor output signal (BMDAT) has BMDAT [55:32] including an error flag (ErrorFlag), a command (WriteEn), an address (Addr), and byte enable (ByteEn), indicating access information.

Next, the operation of the bus monitor circuit 10 of the first embodiment will be described.

Figure 2:
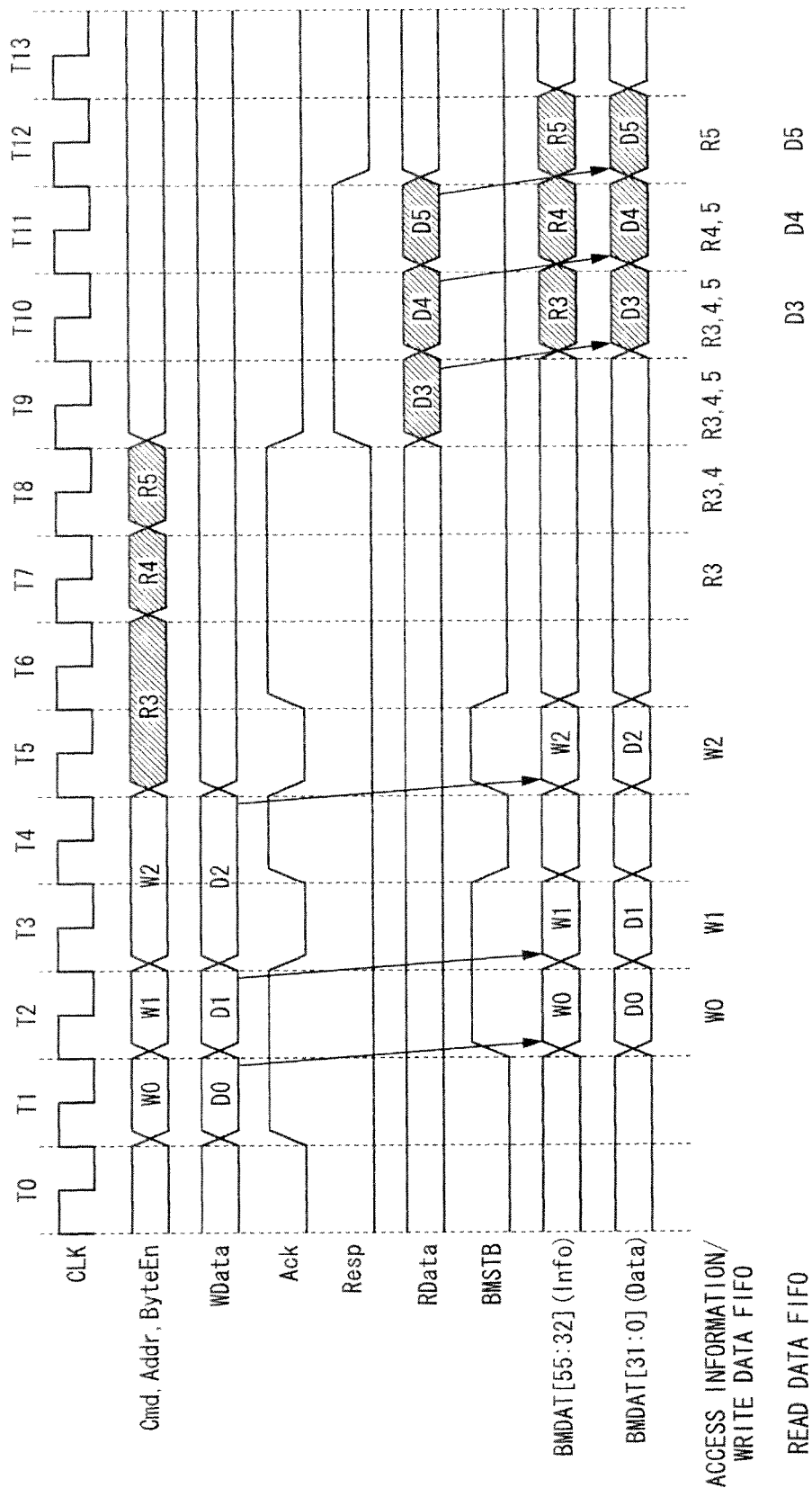
FIG. 2 A timing chart illustrating the operation of tree bus monitor circuit of the first embodiment.
Figure 3:
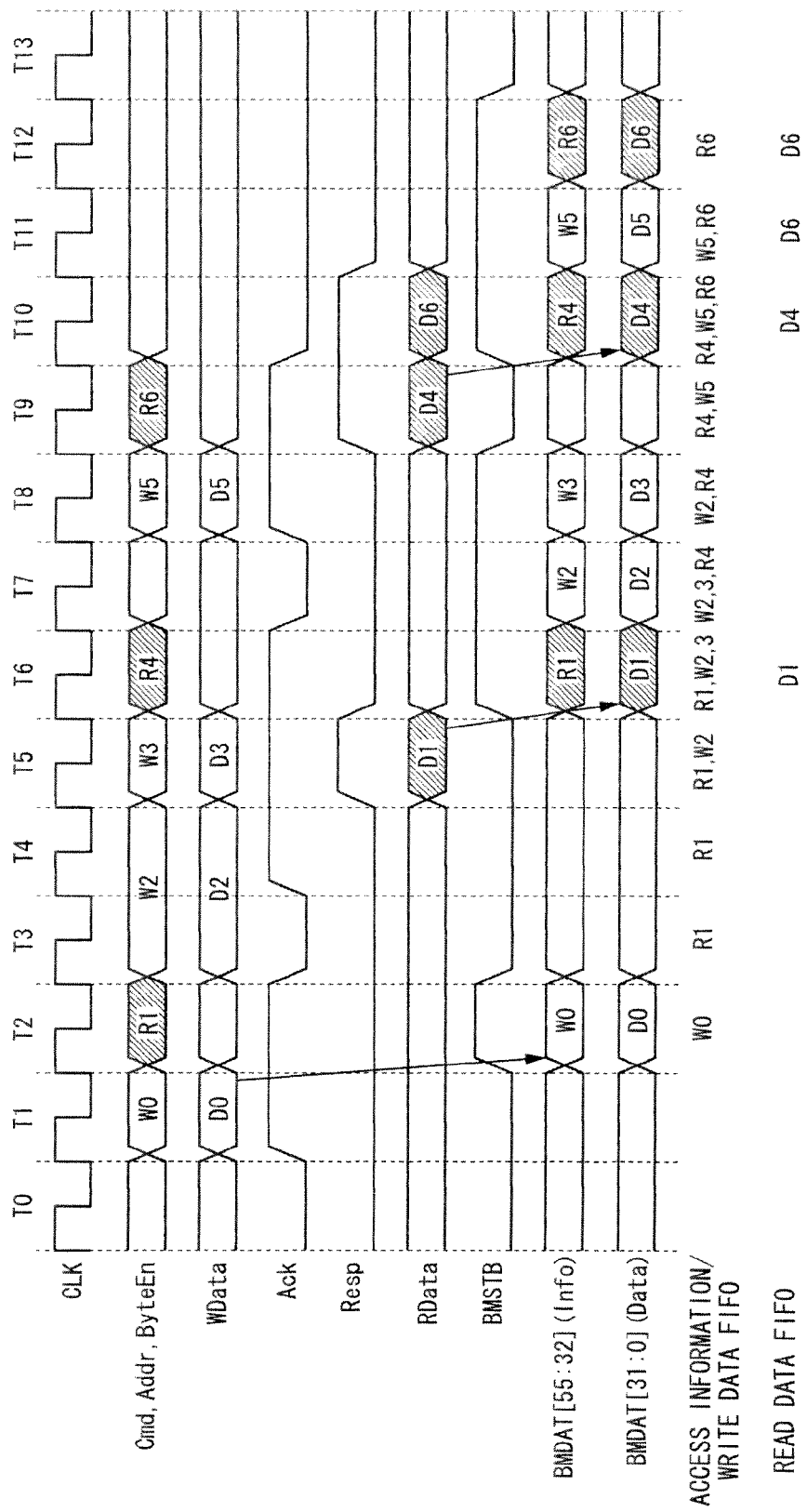
FIG. 3 A timing chart illustrating the operation of the bus monitor circuit of the first embodiment.

FIGS. 2 and 3 are timing charts illustrating operations in various parts of the bus monitor circuit 10 of the first embodiment. The first embodiment exhibits the following operation in accordance with a bus interface protocol enabling pipeline transaction and split transaction in a read mode.

In a write access mode, the master side sets a write address (Addr), sets a write data area/size to a byte enable signal (ByteEn), and sets write data (WData). Additionally, it sets a command (Cmd) at writing so as to wait for a high-level accept signal (Ack) which will be sent back thereto. The slave side declares completion of write access by setting an accept signal (Ack) to a high level in a command-acceptable cycle.

In a read access mode, the master side sets a read address (Addr) and sets a read data area/size to a byte enable signal (ByteEn). Additionally, it sets a command (Cmd) at reading (R) so as to wait for a high-level accept signal (Ack) which will be sent back thereto. Since read data (RData) is being valid in a high-level cycle of a response signal (Resp), the master side is able to acquire the read data. The slave side sets an accept signal (Ack) to a high level in a command-executable cycle while setting a response signal (Resp) to a high level in a cycle in which read data is prepared, thus declaring completion of read access.

As shown in FIGS. 2 and 3, the bus monitor circuit 10 of the first embodiment outputs bus monitor signals indicating access data (BMDAT[31:01 (Data)) paired with the corresponding access information (BMDAT[55:32] (Info)].

To support pipeline transaction in a read mode, the foregoing bus interface protocol allows the master side to specify the next read/write command in the next cycle of a high-level accept signal (Ack) even when it receives read data sent back thereto (see time T7, T8 in FIG. 2). Additionally, the occurrence order of commands may be the reverse of the transmitted order of read data/write data (see data R4, W5 in FIG. 3). However, the transmitted order of data should not be reversed between write accesses or between read accesses.

In this connection, the foregoing bus specification corresponds to an example of a bus interface protocol enabling pipeline transaction in a read mode; hence, this is not a limitation to the applied scope of the first embodiment.

Even when the transmitted order between read data and write data is reversed, it is necessary to output bus monitor signals indicating access data paired with access information. For this reason, the bus monitor circuit 10 of the first embodiment controls the access information/write data FIFO 11 and the read data FIFO 12 in accordance with an attribute of access information (a write/read access) firstly input to the access information/write data FIFO 11. Thus, it is possible to output bus monitor signals without reversing the access occurrence order in the bus interface protocol enabling pipeline transaction which likely causes the reverse between the bus access order and the transmitted order of write data and read data.

When an attribute of access information at a header of the access information/write data FIFO 11 is a write access, the access information is directly outputted together with write data, which is transmitted in the same cycle as the access information, as bus monitor signals. On the other hand, when an attribute of access information at a header of the access information/write data FIFO 11 is a read access, it is necessary to wait for the corresponding read data to be stored in the read data FIFO 12, thereafter, the access information is outputted together with the read data as bus monitor signals. Owing to this function, it is possible to output a pair of data information and access information such as addresses as bus monitor signals in accordance with the stored order of the access information/write data FIFO 11 depending on the occurrence order of bus access.

Figure 4:
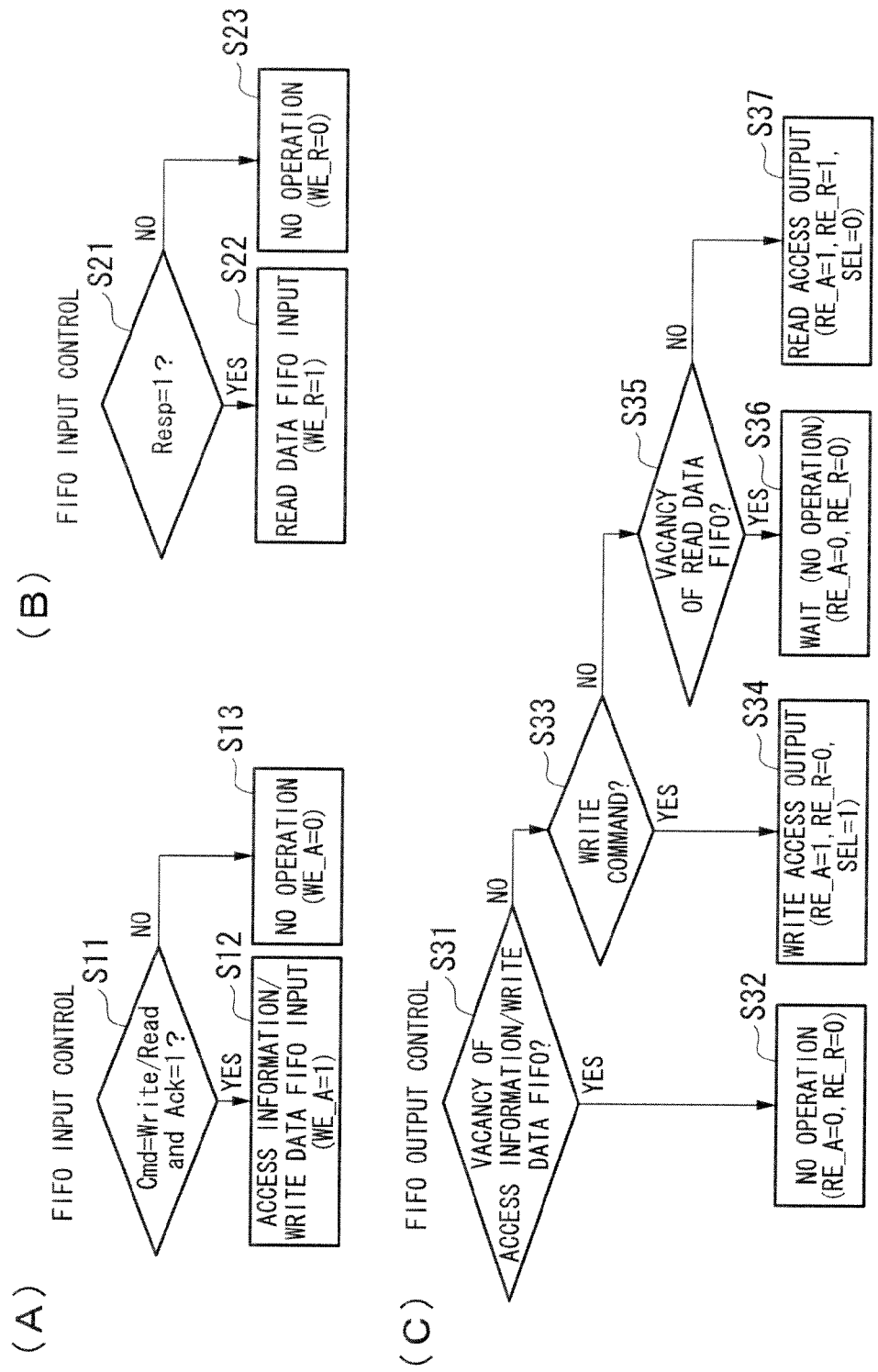
FIG. 4 Flowcharts illustrating FIFO input/output control processes applied to the bus monitor circuit of the first embodiment.

FIG. 4 exhibits flowcharts illustrating FIFO input/output control processes in the bus monitor circuit 10 of the first embodiment. This processing procedure controls the access information/write data FIFO 11 and the read data FIFO 12 so as to output a pair of access information and access data as bus monitor signals.

The FIFO controller 14 performs an FIFO input control process on the access information/write data FIFO 11 in accordance with a flowchart of FIG. 4(A). First, it determines the transmitted timing of a write command/read command on a bus, i.e. whether a command (Cmd) indicates write (W)/read (R) and whether or not an accept signal (Ack) is in a high-level cycle (step S11). It sets a write enable signal WE_A=1 so as to latch a command (Cmd), an address (Addr), a byte enable signal (ByteEn), and write data (WData) in the access information/write data FIFO 11 when the command indicates write (W)/read (R) while the accept signal (Ack) is in a high-level cycle (step S12). When the determination result of step S11 is "NO", the FIFO controller 14 sets a write enable signal WE_A=0 so as not to perform an FIFO input control process on the access information/write data FIFO 1 (step S13).

The FIFO controller 15 performs an FIFO input control process on the read data FIFO 12 in accordance with a flowchart of FIG. 4(B). First, it determines the returned timing of read data on a bus, i.e. whether or not a response signal (Resp) is in a high-level cycle (step S21). It sets a write enable signal WE_R=1 while latching read data (RData) in the read data FIFO 22 when the response signal (Resp) is in a high-level cycle (step S22). When the determination result of step S21 is "NO", the FIFO controller 15 sets a write enable signal WE_R=0 so as not to perform an FIFO input control process on the read data FIFO 12 (step S23).

Next, the FIFO output control processing for the access information/write data FIFO 11 and the read data FIFO 12 will be described with reference to a flowchart of FIG. 4(C). An FIFO output control process branches away depending on the statuses (i.e. determination as to whether or not it is empty) regarding two types of FIFOs 11, 12 and a command attribute of first bus access (i.e. determination as to whether a command (WriteEn) of BMDAT[54] is write (W) or read (R)).

In FIG. 4(C), the FIFO controllers 14, 15 determine whether or not the status of the access information/write data FIFO 11 is empty (step S31). They do not perform an FIFO output control process when the status of the access information/write data FIFO 11 is empty (step S32).

The FIFO controllers 14, 15 determine whether or not a command attribute of access information at a header is write (W) when the status of the access information/write data FIFO 11 is not empty (step S33). The FIFO controllers 14, 15 directly output write access (i.e. a command (Cmd), an address (Addr), a byte enable (ByteEn), and write data (WData)), which is stored in a header of the access information/write data FIFO 11, as bus monitor signals (RE_A=1, SEL=1, BMSTB=1) when a command attribute of access information at a header is write (W) (step S34). At this time, write data (WData) of the access information/write data FIFO 11 is selectively applied to a data portion of bus monitor signals since the data information selector 16 indicates SEL=1.

On the other hand, the FIFO controllers 14, 15 performs an FIFO output control process depending on the status of the read data FIFO 12 when a command attribute of access information at a header of the access information/write data FIFO 11 is read (R). That is, the FIFO controllers 14, 15 determines whether or not the status of the read data FIFO 12 is empty (step S35). Since no read data has been sent back on a bus when the status of the read data FIFO 12 is empty, an FIFO output control process is not performed on the FIFOs 11, 12, which are thus placed in a standby state (RE_A=0, RE_R=0) (step S36). When the next access infoiuration is output on a bus in the standby state, bus access data are accumulated in the access information/write data FIFO 11.

When an attribute of access information at a header of the access information/write data FIFO 11 is read (R) while the status of the read data FIFO 12 is no longer empty since read data has been sent back, the FIFO controllers 14, 15 output bus monitor signals (i.e. RE_A=1, RE_R=1, SEL=0, BMSTB=1) together with read access (i.e. a command (Cmd), an address (Addr), a byte enable signal (ByteEn), and read data (RData)) stored at a header of the FIFOs 11, 12 (step S37). At this time, due to SEL=0 in the data information selector 16, read data (RData) of the read data FIFO 12 is selectively output as a data portion of bus monitor signals.

According to the foregoing processing procedure, the bus monitor circuit 10 of the first embodiment is able to output bus monitor signals indicating a pair of access information and data information as shown in FIGS. 2 and 3.

In cycles at times T2, T3, T5 of FIG. 2 and at times T2, T7, T8, T11 of FIG. 3, at which an attribute of access information at a header of the access information/write data FIFO 11 is write access, write address information paired with the corresponding write data is directly output. In FIGS. 2 and 3, BMDAT[55:32] (Info) indicates access information while BMDAT[31:01] (Data) indicates data information (access data) among bus monitor signals.

Since an attribute of access information at a header of the access information/write data FIFO 11 is read access in cycles at times T7, T8, T9 of FIG. 2 and at times T3, T4, T5, T9 of FIG. 3, it is necessary to wait for the corresponding read data to be input to the read data FIFO 12, thereafter, read address information paired with read data is output in cycles at times T10, T11, T12 of FIG. 2 and at times T6, T10, T12 of FIG. 3.

In cycles at times T8, T9 of FIG. 2 and at times T5, T6, T7, T9, T10 of FIG. 3, the next bus access occurs in read data. In this case, the bus access is stored in the access information/write data FIFO 11, so that FIFO processes are sequentially performed after the output of bus access waiting for read data at a header.

Prior to a cycle at time T11 of FIG. 3, read data has been sent back on a bus in a cycle in which an attribute of access information at a header of the access information/write data FIFO 11 is write access. In this case, write access information at a header of the access information/write data FIFO 11 is output as bus monitor signals while read data is stored in the read data FIFO 12.

As described above, the bus monitor circuit 10 of the first embodiment performs the output control in association with two types of FIFOs, i.e. the access information/write data FIFO 11 and the read data FIFO 12: hence, it is possible to guarantee that the order of bus monitor signals is identical to the occurrence order of bus access. That is, it is possible to output bus monitor signals in the occurrence order of bus access in the bus interface protocol enabling pipeline transaction in a read mode with a possibility that the transmitted order of write data and read data may be the reverse of the actual occurrence order of bus access.

Next, system LSI and SoC will be described as applied examples of the bus monitor circuit 10 of the first embodiment.

Figure 5:
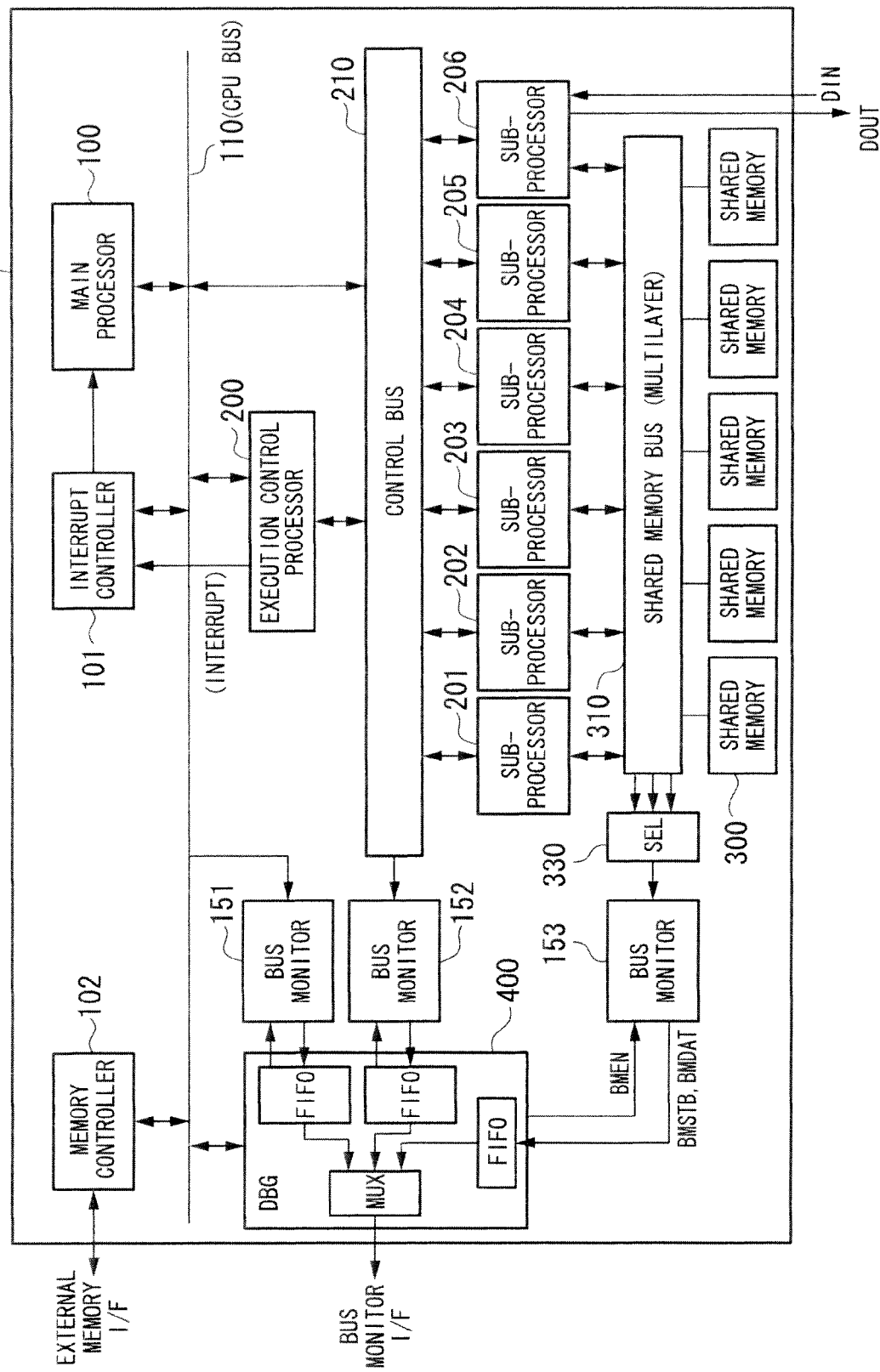
FIG. 5 A block diagram showing the constitution of a data coding/decoding process system adopting the bus monitor circuit of the first embodiment.

FIG. 5 is a block diagram showing the constitution of a data coding/decoding process system 500, which corresponds to system LSI or Soc adopting the bus monitor circuit 10 of the first embodiment.

The data coding/decoding process system 500 shown in FIG. 5 includes a main processor (CPU), which entirely controls the system, a CPU bus 110, an interrupt controller 101, and an external memory controller 102. Additionally, it includes five sub-processors 201 to 205 as processor elements (functional blocks) actually performing data coding/decoding processes, and a single sub-processor 206 as a processor element (a functional block) performing a data transmission interface with an external device.

The data coding/decoding process system 500 implements an execution control processor 200 to control the sub-processors 201 to 206. Additionally, a control bus 210 is interposed between the execution control processor 200 and the sub-processors 201 to 206. Data transmission between the sub-processors 201 to 206 is carried out via a shared memory 300. Since the shared memory 300 has a multi-bank configuration, the sub-processors 201 to 206 are able to access individual banks of the shared memory 300 in parallel via a shared memory bus 310 having a multilayered configuration.

The CPU bus 110, the control bus 210, and the shared memory bus 310 improve a throughput in data transmission in accordance with the bus interface protocol, shown in FIGS. 2 and 3, enabling pipeline transaction (or split transaction) in a read mode. Additionally, data transmission between the sub-processors 201 to 206 is completely carried out via the shared memory 300; hence, it is unnecessary to provide a direct communication means between the individual sub-processors 201 to 206. Owing to the multiprocessor configuration, it is expected to improve reusability of the sub-processors 201 to 206 and to improve extensibility of the entire system.

For the sake of external observation on bus access onto a CPU bus 110, a control bus 210, and a shared memory bus 310, which serve as main bus interfaces in a chip, outside a chip, the data coding/decoding process system 500 includes three bus monitors 151, 152, 153 and a debug block (DBG) 400 for controlling actual bus monitor signals. Due to the multilayered configuration of the shared memory bus 310 a bus selector (SEL) 330 selects which layer of bus access needs to be output as bus monitor signals. Herein, each of the bus monitor circuits 151 to 153 has the same constitution as the bus monitor circuit 10 shown in FIG. 1.

In a data coding process of the data coding/decoding process system 500, the main processor 100 sends an execution command of a coding sequence to the execution control processor 200. Upon receiving a transmission complete status of coding data from the main processor 100, the execution control processor 200 sends a command of a coding process A1 to the sub-processor 204. Upon receiving a completion status of the coding process A1 from the sub-processor 204, the execution control processor 200 sends a command of a coding process A2 to the sub-processor 205. Upon receiving a completion status of the coding process A2 from the sub-processor 205, the execution control processor 200 sends a command of a coding data transmission process to the sub-processor 206. Upon receiving the foregoing commands, the sub-processors 204 to 206 read processing data from the shared memory 300 so as to execute their processes, thereafter, resultant data is written into the shared memory 300, or data transmission outside a chip is executed.

In a decoding process of the data coding/decoding process system 500, the main processor 100 sends an execution command of decoding sequence to the execution control processor 200. Upon receiving a transmission completion status of input data which periodically occurs in the sub-processor 206, the execution control processor 200 sends a command of a decoding process B1 to the sub-processor 201. Upon receiving a completion status of the decoding process B1, the execution control processor 200 sends a command of a decoding process B2 to the sub-processor 202. Upon receiving a completion status of the decoding process B2, the execution control processor 200 sends a command of a decoding process B3 to the sub-processor 203. Upon receiving a completion status of the decoding process B3, the execution control processor 200 issues a notification interrupt of decoding data to the main processor 100. Upon receiving the foregoing commands, the sub-processors 201 to 203 read processing data from the shared memory 300 so as to execute their processes, thereafter, result data is written into the shared memory 300.

To output bus monitor signals regarding bus access to a main bus interface inside a chip for the sake of debugging, the main processor 100 sets which bus interface of bus access needs to be output as bus monitor signals in connection with the debug block 400. Additionally, it determines filter setting for limiting bus access, used for outputting bus monitor signals, within an address range and a data range, while it also determines trigger setting for timing control and start/stop conditions of bus monitor signals. The debug controller 400 starts a bus monitor output operation with the bus monitor circuits 151 to 153 by producing a high level as a bus monitor output enable signal with respect to the bus monitor circuits 151 to 153 relating to the selected bus interface.

Since the bus monitor circuit 10 of the first embodiment is employed as the bus monitor circuits 151 to 153, it is possible to output bus monitor signals indicating a pair of access information and data information and guaranteeing the occurrence order of bus access in each bus interface. Based on a bus monitor output strobe signal (BMSTB) and bus monitor output data (BMDAT) output from the bus monitor circuits 151 to 153, the debug block 400 controls filtering and triggering so as to temporarily store each processing result in an FIFO inside the debug block 400. When one bus monitor output data cannot be produced in one cycle due to limitations to the output clock frequency and the number of external output pins for outputting bus monitor signals, the MUX of the debug block 400 performs a multiplexing process on bus monitor output data. Additionally, when a plurality of bus interfaces is selected, access meditation is conducted between bus interfaces, thereafter, bus monitor output data is sequentially outputted from each FIFO.

In this case, it is possible to concurrently perform observation (i.e. a bus monitor output) on three systems of bus interfaces in total, i.e. the CPU bus 110, the control bus 210, and one layer of the shared memory bus 310. Additionally, it is possible to acquire temporal information at an observation outside a chip by implementing a mechanism that applies a time stamp to access information, such as an address (Addr), input from the bus monitor circuits 151 to 153. This method makes it possible to observe the access occurrence order among a plurality of bus interfaces.

Second Embodiment

Figure 6:
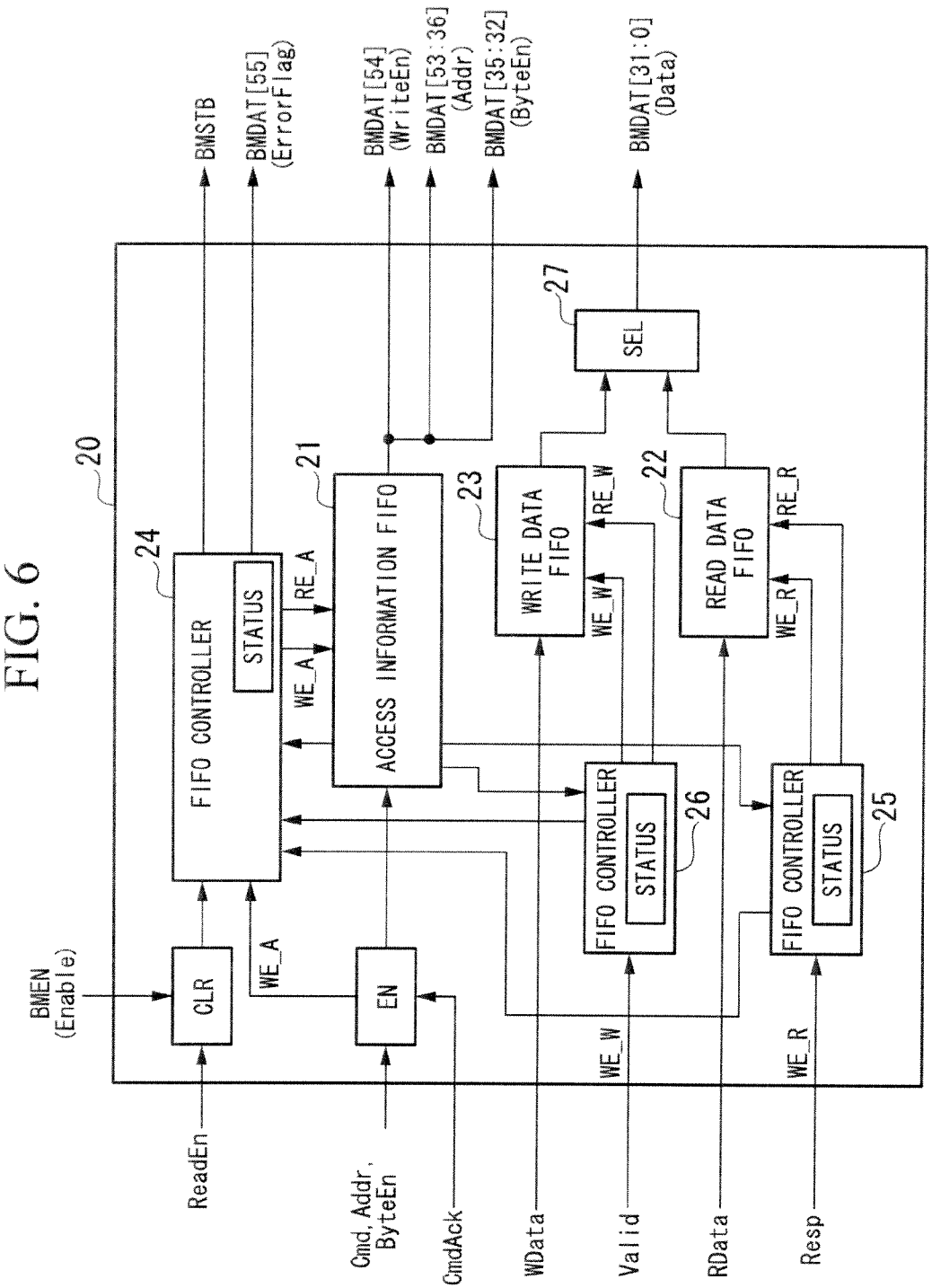
FIG. 6 A block diagram showing the constitution of a bus monitor circuit according to a second embodiment of the present invention.

FIG. 6 is a block diagram showing a bus monitor circuit 20 according to a second embodiment of the present invention. The bus monitor circuit 20 of the second embodiment adapts to a bus interface protocol undergoing different timings of transmitting access information, such as a command and an address, write data, and read data.

To adapt to a bus interface protocol undergoing different timings of transmitting access information, read data, and write data, the bus monitor circuit 20 shown in FIG. 6 includes three types of FIFOs, i.e, an access information FIFO 21, a read data FIFO 22, and a write data FIFO 23. The access information FIFO 21 stores access information such as a command and an address transmitted onto a bus being monitored. The read data FIFO 22 stores read data, while the write data FIFO 23 stores write data.

Compared to the first embodiment, the second embodiment is characterized by independently providing three types of FIFOs, i.e. the access information FIFO 21, the read data FIFO 22, and the write data FIFO 23. Additionally, it includes FIFO controllers 24, 25, 26 to individually control the access information FIFO 21, the read data FIFO 22, and the write data FIFO 23. Moreover, it includes a data information selector (SEL) 27 that selects the output of the read data FIFO 22 or the write data FIFO 23.

Similar to the first embodiment, the access information of the second embodiment presumes a command (Cmd) representing an access attribute that discriminates write access and read access, an address (Addr) that specifies a write address in a write mode or that specifies a read address in a read mode, and a byte enable signal (ByteEn) that indicates an access area and a data size.

A write enable signal (WE_A) of the access information FIFO 21 includes a and (Cmd) and a command accept signal (CmdAck) indicating that access information including a command on a bus has been accepted. A read enable signal (RE_A) of the access information FIFO 21 includes a status of the access information FIFO 21, an access attribute (i.e. a write/read access) of data at a header of the access information FIFO 21 and a status of the write data FIFO 23 or a status of the read data FIFO 22.

A write enable signal (WE_R) of the read data FIFO 22 includes a response signal (Resp) indicating that read data has been transmitted onto a bus. A read enable signal (RE_R) of the read data FIFO 22 includes a status of the read data FIFO 22, a status of the access information FIFO 21, and an access attribute (i.e. a write/read access) of data at a header of the access information FIFO 21.

A write enable signal (WE_W) of the write data FIFO 23 includes a valid signal (Valid) indicating that write data has been transmitted onto a bus. A read enable signal (RE_W) of the write data FIFO 23 includes a status of the write data FIFO 23, a status of the access information FIFO 21, and an access attribute (i.e. a write/read access) of data at a header of the access information FIFO 21.

Similar to the first embodiment, the second embodiment includes a data information selector (SEL) 27 to output bus monitor signals including a pair of access information and data information (access data).

Figure 7:
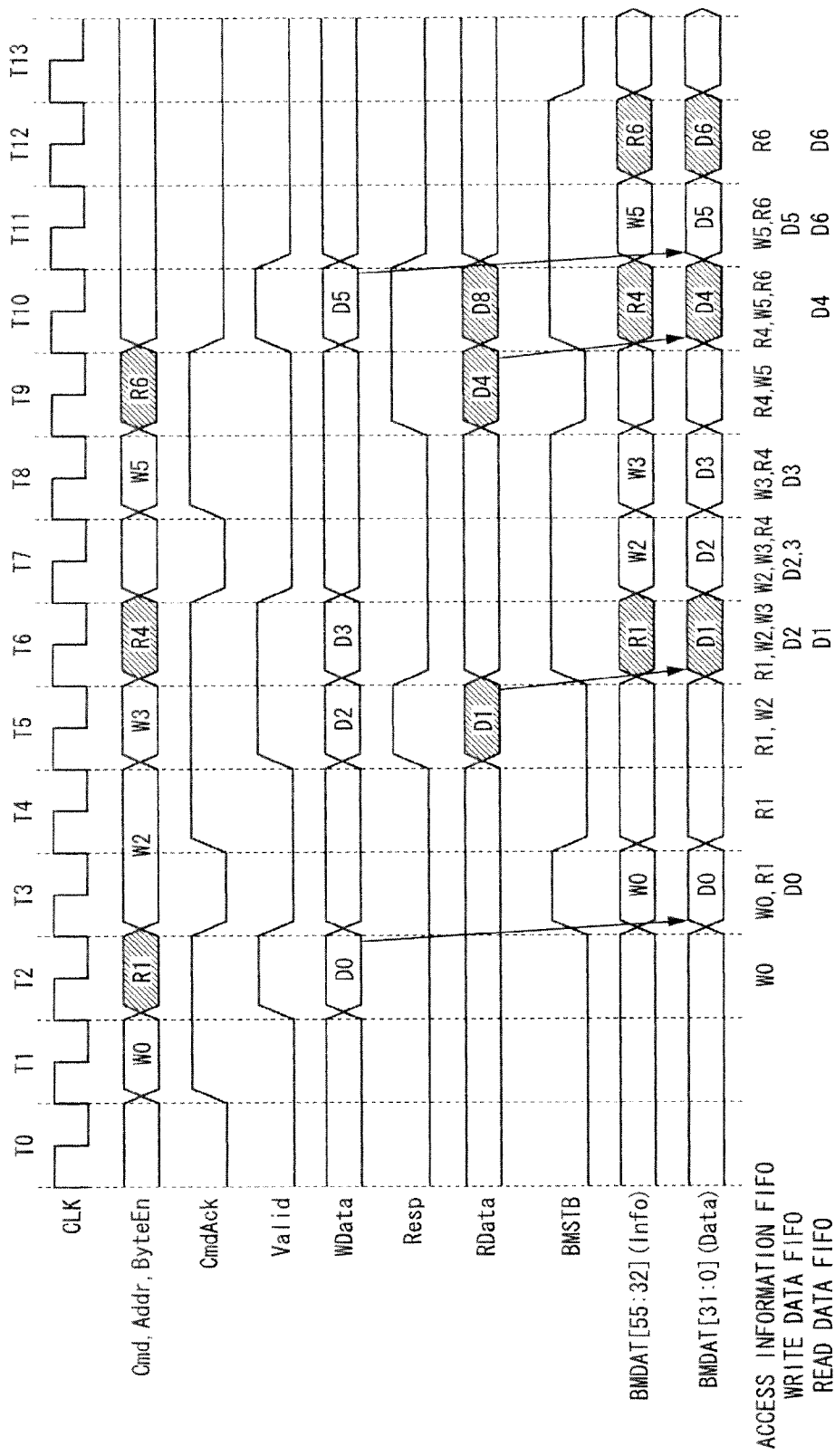
FIG. 7 A timing chart illustrating the operation of the bus monitor circuit of the second embodiment.

Next, the operation of the bus monitor circuit 20 of the second embodiment will be described. FIG. 7 is a timing chart illustrating the operation of the bus monitor circuit 20 of the second embodiment.

The second embodiment adopts a bus interface protocol enabling pipeline transaction (split transaction) in a read mode as similar to the bus interface protocol adopted in the first embodiment. The second embodiment differs from the first embodiment in that it can separate cycles of transmitting access information such as a command (Cmd), an address (Addr), and a byte enable signal (ByteEn) from actual cycles of transmitting write data (WData) in a write access mode. Compared to the first embodiment, the second embodiment additionally provides a valid signal (Valid) from the master, indicating cycles of transmitting write data (WData), to the slave.

In this connection, it is possible to additionally provide a data accept signal (DataAck) from the slave to the master if handshaking with the slave is needed with respect to write data (WData). Similar to the first embodiment, the second embodiment undergoes an event in which the transmitted order of access information may be reverse to the transmitting order of read data and write data due to its bus interface protocol. However, it does not allow for an event in which the transmitted order of data information will be reversed between write accesses or between read accesses.

The second embodiment employs the same format of bus monitor signals as the first embodiment. That is, it includes a bus monitor strobe signal (BMSTB) and a bus monitor output signal (BMDAT). Herein, a bus monitor output signal (BMDAT) becomes valid in a high-level cycle of a bus monitor strobe signal (BMSTB). Similar to the first embodiment, the second embodiment is able to output a pair of access information, such as a command (WriteEN), an error flag (ErrorFlag), an address (Addr), and a byte enable signal (ByteEn), and data information (access data), such as write data (WData) or read data (RData), in the same cycle based on the bitwise configuration of a bus monitor output signal (BMDAT).

The second embodiment outputs bus monitor signals indicating a pair of access information and write data/read data, which are transmitted in different cycles according to a bus interface protocol, in the same cycle. Similar to the first embodiment, the second embodiment is able to easily conduct debugging with a high reliability because it guarantees the correlation between access information and data information when externally observed outside a real chip. Additionally, write data and read data share the predetermined bit portion of a bus monitor output signal; hence, it is possible to output a large amount of information with a small number of bits.

The bus monitor circuit 20 of the second embodiment outputs access information, such as a command (Cmd), an address (Addr), and a byte enable signal (ByteEn) which are transmitted from the master to the slave, by way of the access information FIFO 21. Write data (WData) is output via the write data FIFO 23. Read data (RData) transmitted in a direction from the slave to the master is output via the read data FIFO 22.

A bus interface protocol of the second embodiment adapts to different timings of transmitting access information, write data, and read data. To adapt to this bus interface protocol, the bus monitor circuit 20 of the second embodiment controls the access information FIFO 21, the read data FIFO 22, and the write data FIFO 23 by means of three types of FIFO controllers 24, 25, and 26.

Figure 8:
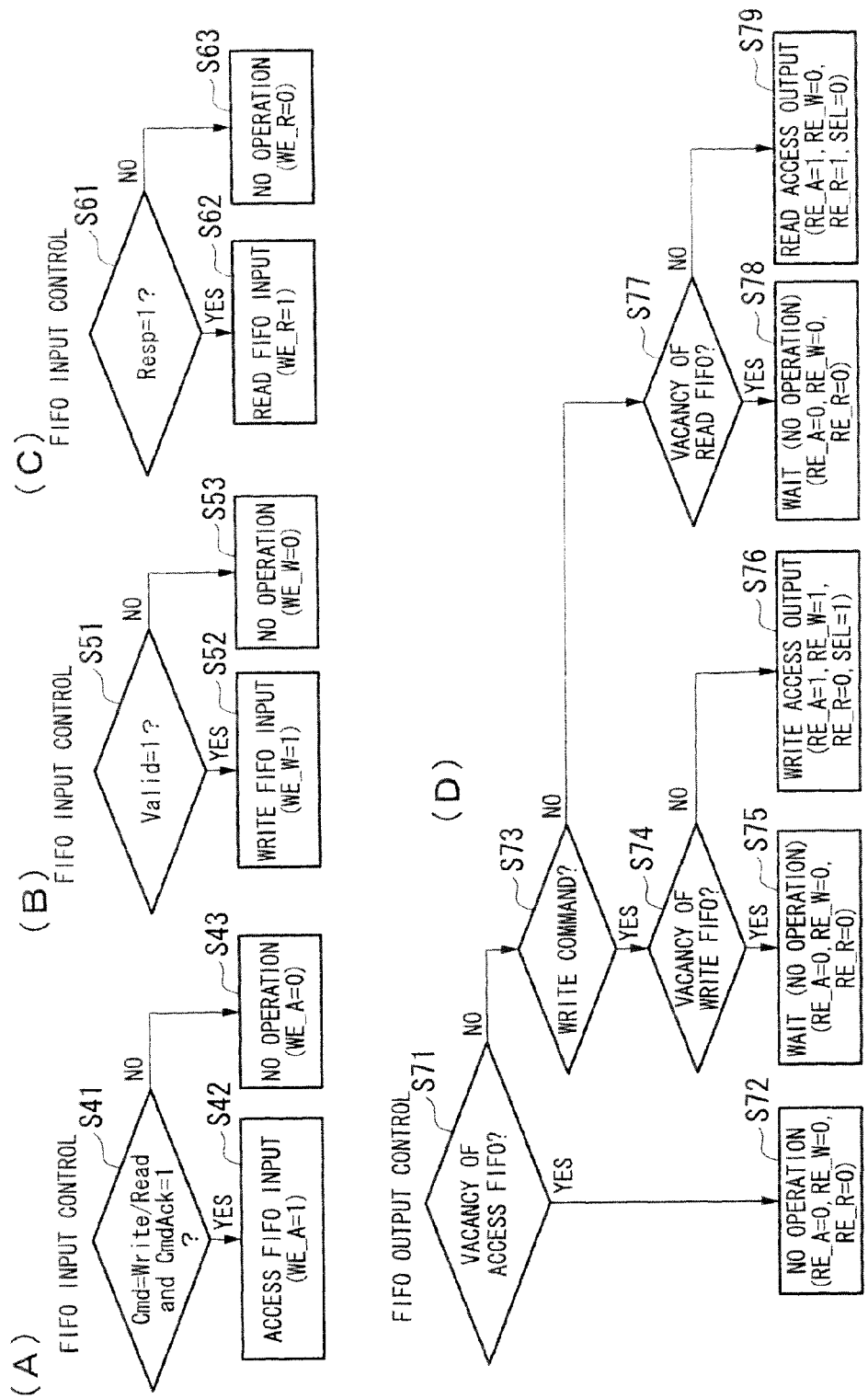
FIG. 8 Flowcharts illustrating FIFO input/output control processes applied to the bus monitor circuit of the second embodiment.

FIG. 8 exhibits flowcharts illustrating FIFO input/output control processes applied to the bus monitor circuit 20 of the second embodiment.

First, FIFO input control processes will be described. In FIG. 8(A), the FIFO controller 24 controlling the access information FIFO 21 determines the timing of transmitting a write command or a read command onto a bus, i.e. whether a command (Cmd) indicates write (W) or read (R), and whether or not a command accept signal (CmdAck) is in a high-level cycle (step S41). The FIFO controller 24 latches a command (Cmd), an address (Addr), and a byte enable signal (ByteEn) in the access information FIFO 21 (WE_A=1) (step S42) when the command (Cmd) indicates write (W) or read (R) and when the command accept signal (CmdAck) is in a high-level cycle. When the determination result of step S41 is "NO", the FIFO controller 24 does not control an input process on the access information FIFO 21 (WE_A=0) (step S43).

In FIG. 8(B), the FIFO controller 26 controlling the write data FIFO 23 determines the timing of transmitting write data onto a bus, i.e. whether or not a valid signal (Valid) is in a high-level cycle (step S51). When a valid signal (Valid) has a high level, the FIFO controller 26 latches write data (WData) in the write data FIFO 23 (WE_W=1) (step S52). When the determination result of step S52 is "NO", the FIFO controller 26 does not control an input process on the write data FIFO 23 (WE_W=0) (step S53).

In FIG. 8(C), the FIFO controller 25 controlling the read data FIFO 22 determines the timing at which read data is sent back on a bus, i.e. whether or not a response signal (Resp) is in a high-level cycle (step 61). In a high-level cycle of a response signal (Resp), the FIFO controller 25 latches read data (RData) in the read data FIFO 22 (WE_R=1) (step S62). When the determination result of step S61 is "NO", the FIFO controller 25 does not control an input process on the read data FIFO 22 (WE_R=0) (step S63).

Input control relating to the access information FIFO 21, the read data FIFO 22, and the write data FIFO 23 in the second embodiment is executed solely depending on a bus signal output to a bus interface.

Next, FIFO output control processes will be described. Herein, output control relating to three types of FIFOs, i.e. the access information FIFO 21, the read data FIFO 22, and the write data FIFO 23, is performed according to the statuses of the read data FIFO 22 and the write data FIFO 23 (i.e. determination whether or not they are empty) and a command (i.e. a write (W)/read (R) command) of access information at a header of the access information FIFO 21.

In FIG. 8(D), the FIFO controllers 24 to 26 determine whether or not the status of the access information FIFO 21 is empty (step S71). They do not control their output processes when the status of the access information FIFO 21 is empty (step S72).

When the determination result of step S71 is "NO", the FIFO controllers 24 to 26 determine whether or not a write command (W) is stored in access information at a header of the access information FIFO 21 (step S73).

When the access information at a header of the access information FIFO 21 indicates a write command (W), the FIFO controllers 24 to 26 determines whether or not the status of the write data FIFO 23 is empty (step S74). When the status of the write data FIFO 23 is empty indicating that write data has not been transmitted onto a bus yet, they do not control their FIFO output processes and are therefore placed in a standby state (RE_A=0, RE_W=0) (step S75). When the status of the write data FIFO 23 is not empty, they output bus monitor signals (RE_A=1, RE_W=1, SEL=1, BMSTB=1) indicating access information (i.e. a command (Cmd), an address (Addr), and a byte enable signal (ByteEn)) at a header of the access information FIFO 21 paired with write data (WData) stored in a header of the write data FIFO 23 (step S76). At this time, due to SEL=1, the data information selector (SEL) 27 selects write data (WData) of the write data FIFO 23, which is stored in a data portion of bus monitor signals.

When access information at a header of the access information FIFO 21 indicates a read command (R) in step S73, the FIFO controllers 24 to 26 determines whether or not the status of the read data FIFO 22 is empty (step S77). When the status of the read data FIFO 22 is empty indicating that read data has not been sent back on a bus yet, the FIFO controllers 24 to 26 do not control their output processes and are therefore placed in a standby state (RE_A=0, RE_R=0) (step S78).

When the status of the read data FIFO 22 is not empty, a read access command (Cmd) stored at a header of the access information FIFO 21, an address (Addr), a byte enable signal (ByteEn), and read data (RData) are combined together and output as bus monitor signals (RE_A=1, RE_R=1, SEL=0, BMSTB=1) (step S79). At this time, due to SEL=0, the data information selector (SEL) 27 selects read data (RData) of the read data FIFO 22, which is stored in a data portion of bus monitor signals.

When the next bus access occurs on a bus in a standby state of steps S75, S78, the access information FIFO 21 accumulates bus access information therein.

The foregoing processing procedure utilizes features of a bus interface protocol in which, relative to a cycle of transmitting access information, such as a command (Cmd) and an address (Addr), its corresponding write data (WData) is transmitted at the same timing as the access information or at the delayed timing, while read data (RData) is transmitted at the same timing as the access information or at the delayed timing.

Owing to the foregoing processing procedure, the bus monitor circuit 20 of the second embodiment is able to output bus monitor signals indicating a pair of access information and data information (access data) as shown in FIG. 7.

In cycles at times T3, T7, T8, T11 of FIG. 7 in which access information at a header of the access information FIFO 21 indicates a write command (W), for example, it is necessary to wait for the corresponding write data to be input to the write data FIFO 23, thereafter, a pair of access information and its corresponding write data is output.

In cycles at times T4, T5, T9 of FIG. 7, access information at a header of the access information FIFO 21 indicates a read command (R); hence, it is necessary to wait for the corresponding read data to be input to the read data FIFO 22, thereafter, a pair of access information and its corresponding read data is output in cycles at times T6, T10, T12.

En cycles at times T5, T6, T7, T9, T10 of FIG. 7, the next bus access occurs in a standby state of write data or in a standby state of read data. In this case, bus access data is stored in the access information FIFO 21 so that they are sequentially subjected to FIFO processes after access information in a standby state of read data at a header is output.

When read data is sent back on a bus in a cycle in which access information at a header of the access information FIFO 21 indicates a write access, the read data is stored in the read data FIFO 22. At time T10 of FIG. 7 in which access information at a header of the access information FIFO 21 is in a read access cycle and in which write data has been transmitted onto a bus, the write data is stored in the write data FIFO 23.

As described above, the second embodiment controls its output process in association with three FIFOs, i.e. the access information FIFO 21, the read data FIFO 22, and the write data FIFO 23, so that it guarantees that the transmitted order of bus monitor signals matches the input order of access information into the access information FIFO 21. As shown in FIG. 7, it is possible to output bus monitor signals in the occurrence order of bus access in a bus interface protocol enabling pipeline transaction in a read mode with a possibility that the transmitted order of write data and read data may be the reverse of the actual occurrence order of bus access.

Next, a method of setting the number of FIFO stages in the bus monitor circuits 10, 20 of the first and second embodiments (see FIGS. 1 and 6) and an error notification mechanism will be described.

It is possible to estimate the number of FIFO stages relating to the access information/write data FIFO 11 and the read data FIFO 12, included in the bus monitor circuit 10 of the first embodiment, based on the maximum value of a read latency on a bus being monitored (i.e. the number of cycles until a response signal (Resp) sending back read data is changed to a high level after a cycle in which an accept signal (Ack) accepting a read command is changed to a high level). When the bus monitor circuit 10 implements the estimated number of FIFO stages in the bus monitor circuit 10, it is possible to prevent the occurrence of an overflow in each FIFO.

It is possible to estimate the number of FIFO stages, included in the bus monitor circuit 20 of the second embodiment, based on the maximum value of a write latency (i.e. the number of cycles until a valid signal (Valid) is actually changed to a high level so as to transmit write data after a cycle accepting a write command from the master) in addition to the maximum value of the foregoing read latency. That is, when the bus monitor circuit 20 implements the number of FIFO stages which is estimated based on a larger one of the maximum value of the read latency and the maximum value of the write latency, it is possible to prevent the occurrence of an overflow in each FIFO.

Additionally, when a bus controller (e.g. the CPU bus 110, the control bus 210, and the shared memory bus 310 shown in FIG. 5) implements FIFOs that store a master ID and a slave ID waiting for read data in order to control buses, it is possible to employ a measure that prevents an overflow by implementing a bus monitor circuit using the same number of FIFO stages as the number of those FIFOs.

Considering a necessity of implementing the limited number of FIFO stages because of a reduction of a circuit scale, any one of the bus monitor circuit 10 of the first embodiment and the bus monitor circuit 20 of the second embodiment faces a possibility that an overflow may occur in the access information/write data FIFO 11 or the access information FIFO 21. An overflow may occur in the access information/write data FIFO 11 or the access information FIFO 21 when bus accesses larger than the number of FIFO stages consecutively occur on a bus irrespective of a standby state since write data or read data corresponding to access information at a header of each FIFO has not been transmitted onto a bus yet. In this case, it is necessary to notify inconsistency between access information and data information by using an error flag bit of a bus monitor output signal (BMDAT).

Figure 9:
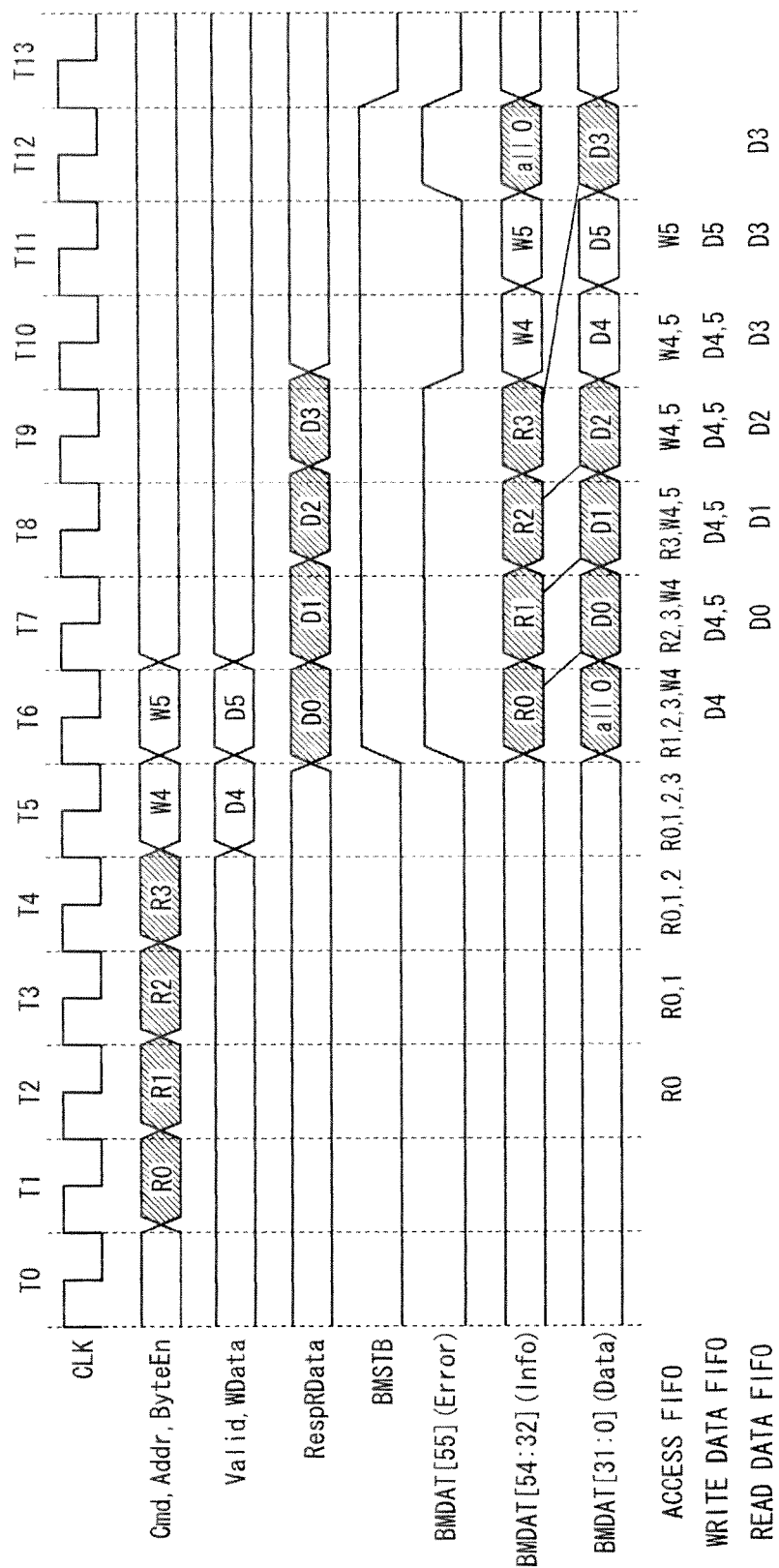
FIG. 9 A timing chart illustrating an error notification mechanism in the bus monitor circuit of the second embodiment.

FIG. 9 is a timing chart illustrating an error notification mechanism of the bus monitor circuit 20 of the second embodiment. FIG. 9 shows the output timing of a bus monitor output signal notifying inconsistency between an address and data by use of an error flag bit. For the sake of simplification, the number of FIFO stages is set to "4"; but this is not a restriction. The actual number of FIFO stages can be set to "8", "16", or "32".

FIG. 9 shows that, when the next bus access occurs (i.e. a cycle at time T5) in a full state of the access information FIFO 21 since read data corresponding to access information has not been input to the read data FIFO 22, the access information at a header of the access information FIFO 21, which may inherently disappear due to the shortage of the number of FIFO stages, is output as bus monitor signals. At this time, due to absence of the corresponding read data, the access information paired with all-zero data is output as bus monitor signals. Additionally, an error flag bit of a bus monitor output signal (BMDAT[55]: ErrorFlag) is set to a high level, thus notifying inconsistency between access information and data information to an external device (see a cycle at time T6).

After the access information FIFO 21 temporarily overflows, inconsistency between access information and data information continues until the status of the access information FIFO 21 becomes empty: hence, if the same access attribute (i.e. a read access (R) in FIG. 9), which is arranged at a header of the access information FIFO 21 when an overflow occurs, is repeated, the error flag continuously maintains a high level until the status of the access information FIFO 21 becomes empty.

After the status of the access information FIFO 21 becomes empty, read data and write data may still remain in the read data FIFO 22 and the write data FIFO 23. In this case, access information is changed to all-zero bits while an error flag is changed to a high level, thus solely outputting data information as bus monitor signals (see a cycle at time T12).

By implementing an error flag notification mechanism, as described above, it is possible to discriminate bus monitor signals with a high reliability and bus monitor signals with a low reliability outside a chip. This prevents bus access information from disappearing, while it is possible to estimate the correlation between access information and data information by use of an error flag bit when externally observed outside a chip.

Third Embodiment

Figure 10:
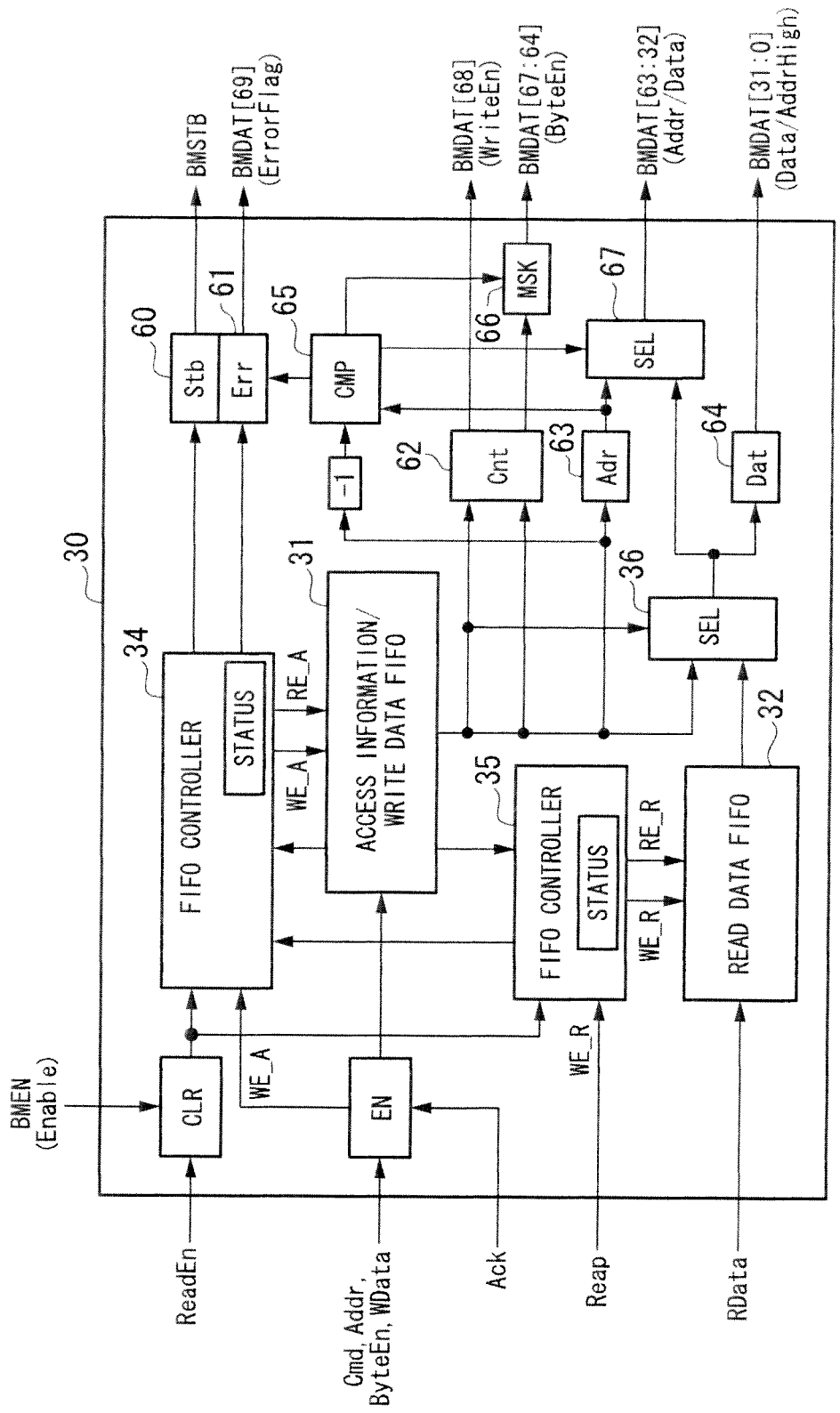
FIG. 10 A block diagram showing the constitution of a bus monitor circuit according to a third embodiment of the present invention.

FIG. 10 is a block diagram showing the constitution of a bus monitor circuit 30 according to a third embodiment of the present invention. The third embodiment generates a bus monitor output signal sharing address information and data information in order to reduce the number of cycles for outputting bus monitor signals.

The bus monitor circuit 30 of the third embodiment provides an extended constitution compared to the bus monitor circuit 10 of the first embodiment. The bus monitor circuit 30 includes two types of FIFOs, i.e. an access information/write data FIFO 31 and a read data FIFO 32. Additionally, the bus monitor circuit 30 includes an FIFO controller 34 for controlling the access information/write data FIFO 31 and an FIFO controller 35 for controlling the read data FIFO 32. The bus monitor circuit 30 includes a data information selector (SEL) in order to output bus monitor signals indicating a pair of access information and data information (access data). This constitution is identical to the constitution of the first embodiment.

As a characteristic constitution of the third embodiment, the access information/write data FIFO 31 and the read data FIFO 32 are followed by delay parts (Stb, Err, Cnt, Adr, Dat) 60 to 64 relating to a bus monitor output signal (BMSTB, BMDAT), an address comparator (CMP) 65, a control information mask (MSK) 66, and an address information selector (SEL) 67.

In the bus monitor circuit 30 of the third embodiment, a bus monitor output signal (BMDAT) has the following bitwise configuration. Herein, BMDAT[63:32] of a bus monitor output signal is allowed to share address information and data information.

Figure 11:
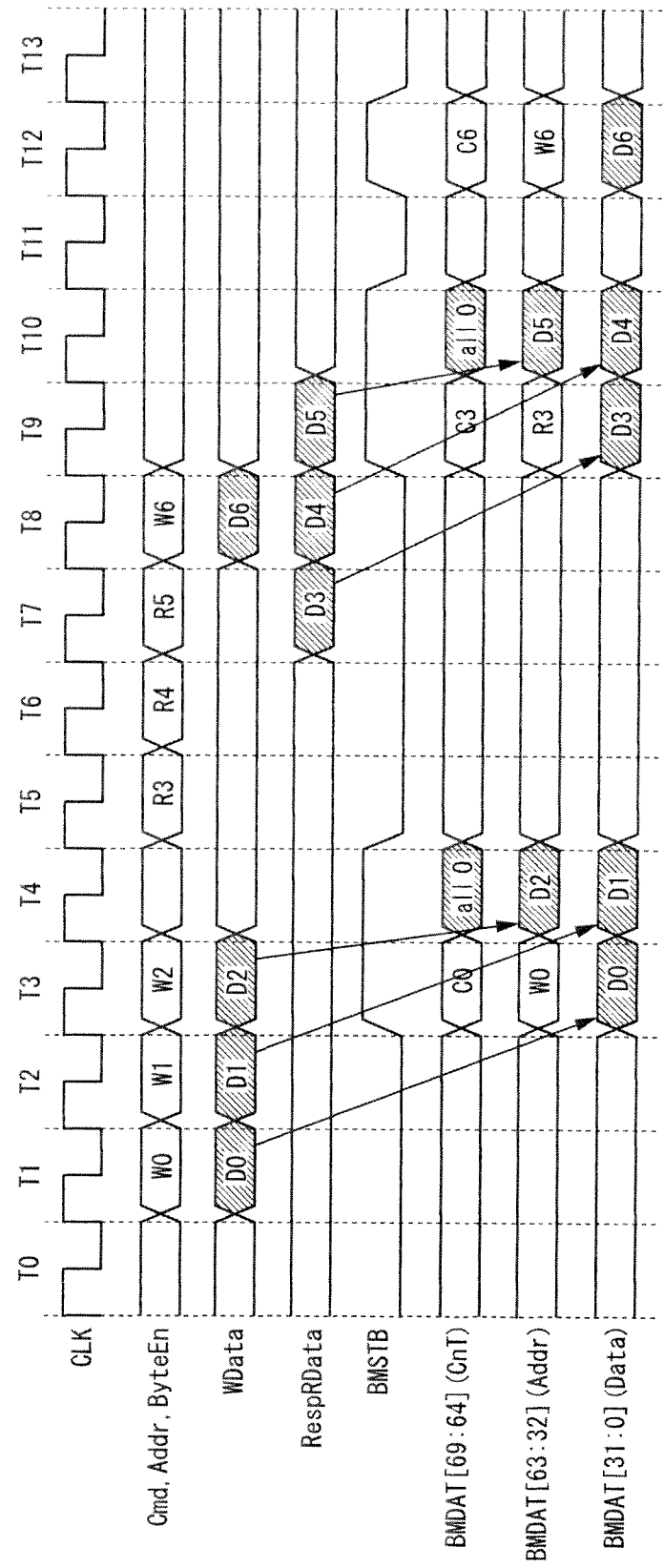
FIG. 11 A timing chart illustrating the operation of the bus monitor circuit of the third embodiment.

BMDAT[69]: error flag (ErrorFlag)
BMDAT[68]: command, write enable (WriteEn)
BMDAT[67:64]: byte enable (ByteEn)
BMDAT[63:32]: address/data (Addr/Data)
BMDAT[31:0]: access data Based on the comparison result of the address comparator (CMP) 65, the control information mask (MSK) 66 determines whether or not to mask control information such as a byte enable signal (ByteEn) while the address information selector (SEL) 67 determines which of address information from the delay part 64 and data information from the data information selector (SEL) 36 should be selected. Next, the operation of the bus monitor circuit 30 of the third embodiment will be described. FIG. 11 is a timing chart illustrating the operation of the bus monitor circuit 30 of the third embodiment. FIG. 11 shows the timing of transmitting a bus monitor output signal, wherein the third embodiment adopts the same bus interface protocol as the first embodiment (see FIGS. 2 and 3).

In FIG. 11, a first row of three write accesses W0, W1, W2 indicate burst accessing to consecutive incremental addresses, while the next row of three read accesses R3, R4, R5 indicate burst accessing to incremental addresses.

Even when the access information/write data FIFO 31 and the data information selector (SEL) 36 provide bus access data, enabling the bus monitor circuit 30 to output bus monitor signals, the third embodiment does not directly output bus access data, but the third embodiment temporarily latches it with the delay parts 60 to 64, relating to a bus monitor output signal, and then outputs it (see cycles at times T2, T3, T8, T9, T11 in FIG. 11). At this latch timing, the address comparator (CMP) 65 compares address information between the current bus access data with the previous bus access data.

When address information of the current bus access data matches an incremental address of the previous bus access data, the current bus access data is maintained in bus monitor signals. The address comparator (CMP) 65 compares address information when the next bus access data enables bus monitor signals to be output. When it is determined that the next bus access data continuously indicates an access to an incremental address, the control information mask (MSK) 66 masks bits of control information, so that, instead of address information of the current bus access data maintained in the address information selector (SEL) 67, the current bus access data is selected and output as bus monitor signals (see times T4, T11 in FIG. 11).

In the above cycle, bits of control information are masked with an all-zero fixed value so that a bus monitor output signal regarding two accesses will be formed using bits of address information and bits of data information. That is, masking bits of control information indicate data information toward an incremental address with respect to the previous bus access data, so that it is possible to output bus monitor signals in one cycle with respect to data information regarding two accesses, which originally need two cycles. Additionally, when the next bus access data does not indicate an access to an incremental address, bus access data retained in the address information selector (SEL) 67 is directly output as bus monitor signals while the next bus access data is latched with the delay parts 60 to 64.

Upon determining an access to an incremental address through comparison of address information between temporally fore-and-aft bus access data, the third embodiment shares address information with data information so as to further reduce the number of cycles for outputting bus monitor signals in comparison with the first embodiment.

Additionally, the third embodiment is able to easily restore actual address information and data information by externally observing whether or not bits of control information are masked outside a chip. When this technical feature is applied to the latter stage of the bus monitor circuit of the first embodiment guaranteeing the access occurrence order, it is expected to further reduce the number of cycles for outputting bus monitor signals. That is, it is possible to demonstrate a technical effect which cannot be realized using the conventional art by way of a bus monitor circuit combined with a technical feature for achieving burst accessing to incremental addresses transmitted on a bus in its original order.

In FIG. 11 in which bus monitor signals can be outputted using a read access R5 for sending back read data at time T9 prior to a write access W6 which occurs in a cycle at time T8, it is possible to achieve burst accessing to incremental addresses relating to the previous read accesses R3, R4. Additionally, the third embodiment is able to demonstrate a high technical effect on an assumption that a bus interface protocol enabling pipeline transaction (split transaction) in a read mode may frequently undergo incremental burst data transmission.

Fourth Embodiment

Figure 12:
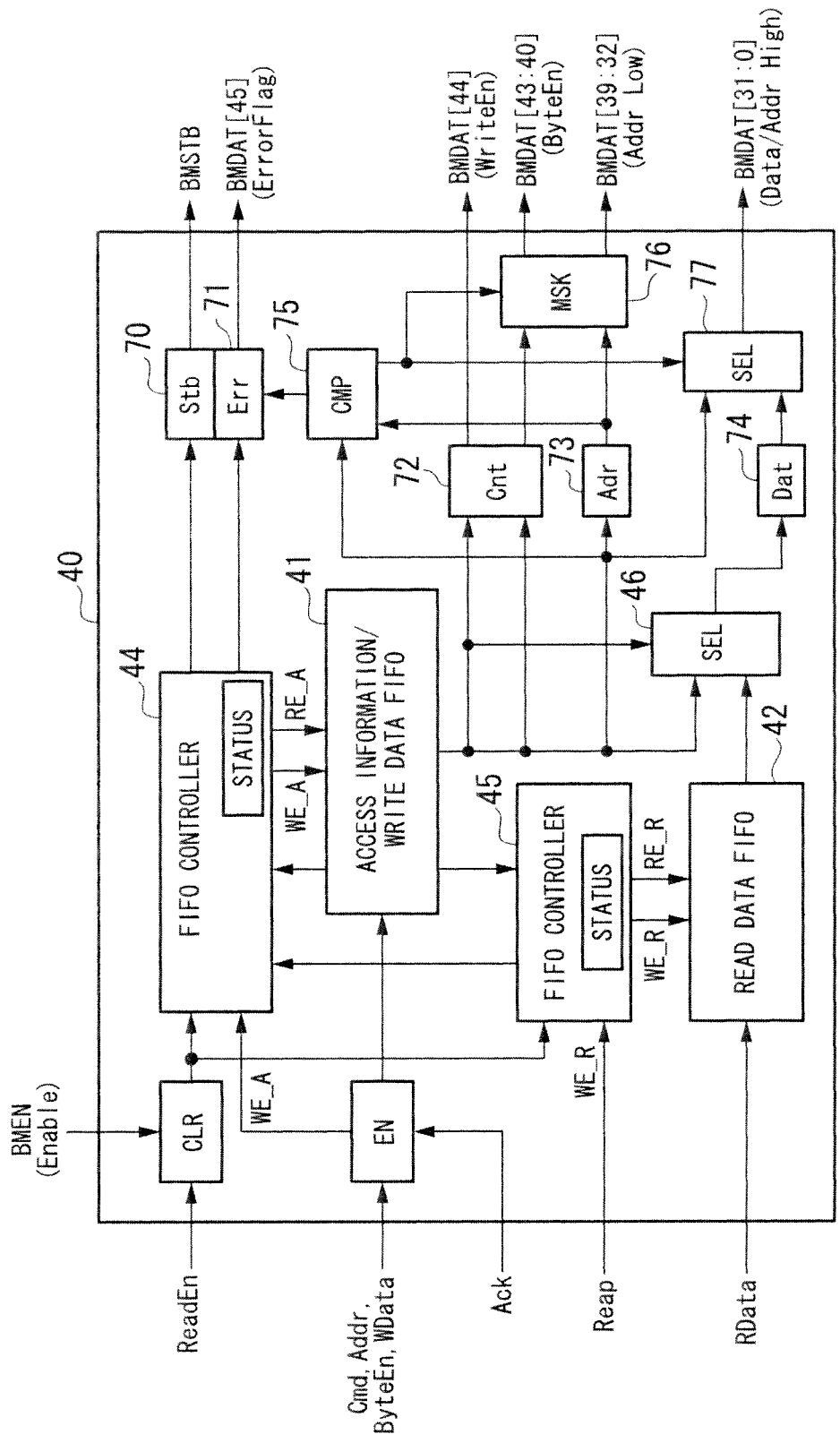
FIG. 12 A block diagram showing the constitution of a bus monitor circuit according to a fourth embodiment of the present invention.

FIG. 12 is a block diagram showing the constitution of a bus monitor circuit 4 according to a fourth embodiment of the present invention. The fourth embodiment produces a bus monitor output signal sharing address information and data information in order to reduce the number of bits configuring a bus monitor output signal.

A bus monitor circuit 40 of the fourth embodiment provides an extended constitution compared to the bus monitor circuit 10 of the first embodiment. The bus monitor circuit 40 includes two types of FIFOs, i.e. an access information/write data FIFO 41 and a read data FIFO 42. The bus monitor circuit 40 includes an FIFO controller 44 that controls the access information/write data FIFO 41 and an FIFO controller 45 that controls the read data FIFO 42. Additionally, the bus monitor circuit 40 includes a data information selector (SEL) 46 in order to output bus monitor signals indicating a pair of access information and data information (access data). This constitution is identical to that of the first embodiment.

As a characteristic constitution of the fourth embodiment as shown in FIG. 12, the access information/write data FIFO 41 and the data information selector (SEL) 46 are followed by delay parts (Stb, Err, Cnt, Adr, Dat) 70 to 74 relating to a bus monitor output signal (BMSTB, BMDAT), an address comparator (CMP) 75, a control information/address information mask (MSK) 76, and a data information selector (SEL) 77.

The bus monitor circuit 40 of the fourth embodiment produces a bus monitor output signal (BMDAT) having the following bitwise configuration. Compared to the first embodiment, the fourth embodiment is able to reduce the number of bits for producing a bus monitor output signal (BMDAT).

BMDAT[45]: error flag (ErrorFlag)
BMDAT[44]: command, write enable (WriteEn)
BMDAT[43:40]: byte enable (ByteEn)
BMDAT[39:32]: address (Addr Low)
BMDAT[31:0]: access data/address (Data/Addr High)

Based on the comparison result of the address comparator (CMP) 75, the control information/address information mask (MSK) 76 determines whether or not to mask a byte enable signal (ByteEn) and lower bits of an address (Addr) (which are reduced to eight bits in FIG. 12), while the data information selector (SEL) 77 determines which of data from the delay elements 70 to 74 and upper bits of an address (Addr) from the access information/write data FIFO 41 should be selected.

Figure 13:
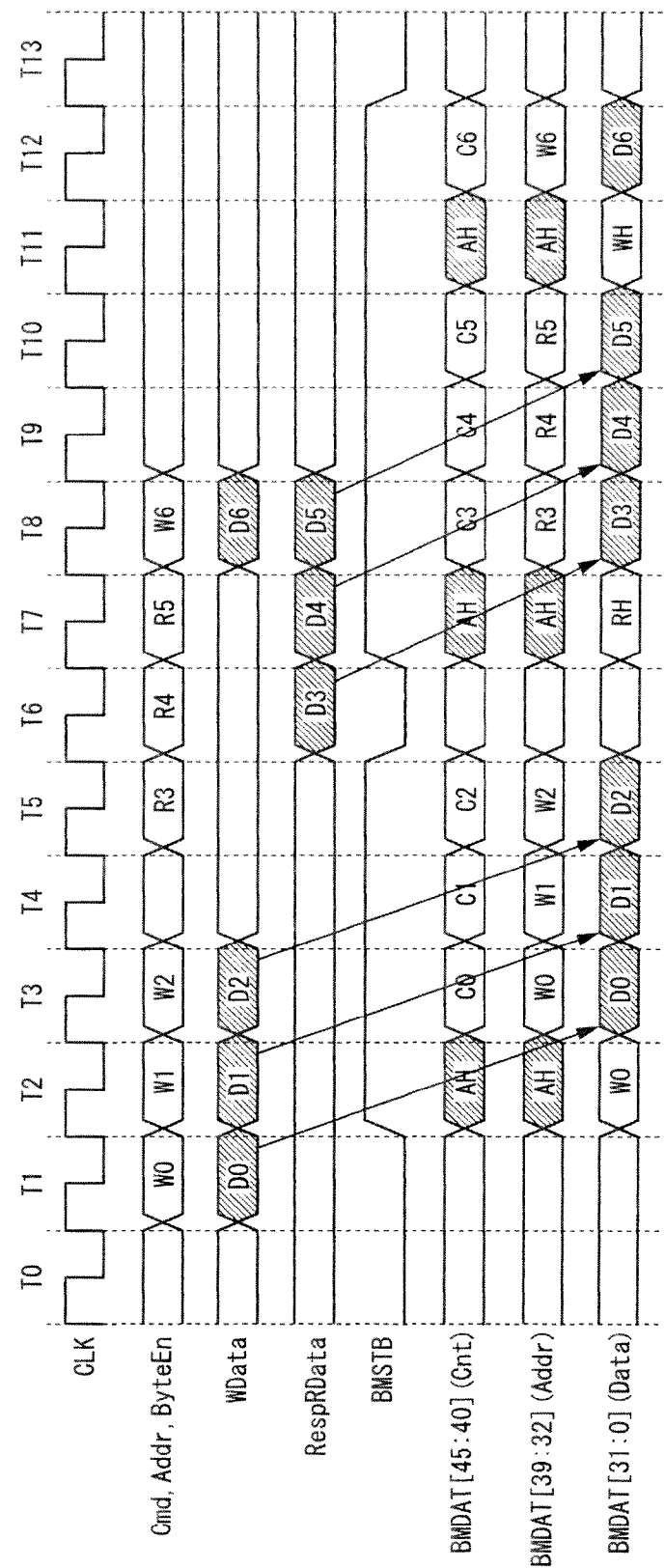
FIG. 13 A timing chart illustrating the operation of the bus monitor circuit of the fourth embodiment.

Next, the operation of the bus monitor circuit 40 of the fourth embodiment will be described. FIG. 13 is a timing chart illustrating the operation of the bus monitor circuit 40 of the fourth embodiment. FIG. 13 shows the timing of transmitting a bus monitor output signal from the bus monitor circuit 40. Additionally, FIG. 13 adopts the bus interface protocol which is identical to that of the first embodiment (see FIGS. 2 and 3).

In FIG. 13, the first three write accesses W0, W1, W2 are accessing to adjacent areas with their addresses (Addr) having the same upper bits, while the next three read accesses R3, R4, R5 are accessing to adjacent areas with their addresses (Addr) having the same upper bits.

In the bus monitor circuit 40, even when the access information/write data FIFO 41 and the data information selector (SEL) 46 output bus access data as bus monitor signals, the fourth embodiment does not directly output a bus monitor output signal but temporarily latches it with the delay parts 70 to 74 in cycles at times T3, T4, T5 T8, T9, T10, T12 in FIG. 13.

Before the latch timing, the address comparator (CMP) 75 compares the current bus access data with the previous bus access data in terms of their upper bits of address information. When the upper bits of an address of the current bus access data matches the upper bits of an address of the previous bus access data, a bus output signal relating to the current bus access data is latched in cycles at times T4, T5, T9, T10 in FIG. 13 and then outputted in the next one cycle. At this time, the lower bits of address information (i.e. eight bits in FIG. 12) are solely outputted.

On the other hand, when the upper bits of an address of the current bus access data differs from the upper bits of an address of the previous bus access data, the bus access data is outputted using two cycles. In a first cycle, the control information/address information mask (MSK) 76 masks control information and address information with bits indicating fixed values. At the same time, the data information selector (SEL) 77 selects upper bits of an address (Addr) of data information so as to output them as bus monitor signals in cycles at times T2, T7, T11 in FIG. 13. Thereafter, a bus monitor output signal relating to bus access data is latched with the delay parts 70 to 74 in cycles at times T3, T8, T12 in FIG. 13; subsequently, the remainder of the bus monitor output signal (i.e. control information, lower bits of an address, and data) is outputted in a second cycle.

Since the first cycle possibly differs from the timing of outputting bus monitor signals relating to the previous bus access data, the FIFO controllers 44 and 45 may need to delay a read cycle of a bus monitor output signal by one cycle with the access information/write data FIFO 41 and the read data FIFO 42.

The bus monitor circuit 40 of the fourth embodiment compares the current bus access data with the previous bus access data in terms of upper bits of their addresses, wherein it solely outputs lower bits of their addresses upon determining that their addresses having the same upper bits are accessing to adjacent areas, while it outputs a bus monitor output signal using two cycles upon determining that upper bits of their addresses are accessing to different areas. By implementing this mechanism, the fourth embodiment is able to further reduce the number of bits configuring a bus monitor output signal (BMDAT) in comparison with the first embodiment.

Additionally, the fourth embodiment is able to easily restore actual bus access information by way of external observation, outside a chip, as to whether or not control information and address information are masked with bits indicating fixed values. When this technical feature of the fourth embodiment is applied to the latter stage of the bus monitor circuit of the first embodiment guaranteeing the access occurrence order, it is possible to reduce a probability regarding the occurrence of a cycle overhead which occurs when bus monitor signals are outputted using two cycles. That is, it is possible to demonstrate a technical effect which cannot be realized using the conventional art by way of the bus monitor circuit, guaranteeing the direct outputting of bus accesses in their occurrence order, combined with the technical feature of the fourth embodiment.

In FIG. 13 in which bus monitor signals can be output using a read access R5 for sending back read data in a cycle at time T8 prior to a write access W6 for transmitting data in the cycle at time T8, it is possible to achieve accessing to adjacent areas relating to the previous read accesses R3, R4. Additionally, it is possible to reduce the number of bits configuring a bus monitor output signal (BMDAT) with a small cycle overhead on an assumption that a bus interface protocol enabling pipeline transaction (split transaction) in a read mode may frequently undergo data transmission, using burst transmission, to adjacent areas.

The present invention is not necessarily limited to the foregoing embodiments; hence, it is possible to provide variations and applications within the scope of the invention as defined in the appended claims.

INDUSTRIAL APPLICABILITY

The present invention is applicable to a bus monitor circuit allowing for external observation, outside a chip, on access information on a bus inside a signal processing chip such as system LSI and Soc. In particular, the present invention adopts a bus interface protocol enabling pipeline transaction and split transaction so as to output bus monitor signals accurately reflecting the bus access occurrence order, thus efficiently achieving debugging with a high reliability.

REFERENCE SIGNS LIST 10 bus monitor circuit
11 access information/write data FIFO
12 read data FIFO
14 FIFO controller
15 FIFO controller
16 data information selector
20 bus monitor circuit
21 access information FIFO
22 read data FIFO
23 write data FIFO
24 FIFO controller
25 FIFO controller
26 FIFO controller
27 data information selector
30 bus monitor circuit
31 access information/write data FIFO
32 read data FIFO
34 FIFO controller
35 FIFO controller
36 data information selector
40 bus monitor circuit
41 access information/write data FIFO
42 read data FIFO
44 FIFO controller
45 FIFO controller
46 data information selector
60-64 delay part
65 address comparator
66 control information mask
67 address information selector
70-74 delay part
75 address comparator
76 control information/address information mask
77 data information selector
100 main processor
101 interrupt controller
110 CPU bus
151-153 bus monitor circuit
200 execution control processor
201-206 sub-processor
210 control bus
300 shared memory
310 shared memory bus
330 bus selector
400 debug block
500 data coding/decoding process system

The invention claimed is:

1. A bus monitor circuit that produces a bus monitor output signal on a bus transmitting data between a master and a slave, said bus monitor circuit comprising:
    a first FIFO;
    a second FIFO that operates at a different timing than the first FIFO;
    a controller that controls the first FIFO and the second FIFO; and
    a selector that selects write data or read data,
    wherein the controller sequentially stores access information corresponding to an occurrence order of bus accesses for both read and write accesses, transmitted on the bus from the master to the slave, thereafter, the controller waits for an output enable state to be established with the first FIFO or the second FIFO, so that the controller controls the first FIFO or the second FIFO to output write data or read data in response to a write access or a read access specified by an attribute of the access information stored at a header of the first FIFO while controlling the first FIFO to output the access information, and
    wherein the selector selects either write data or read data according to the attribute of the access information so as to output the selected data paired with the access information in a same cycle.

2. The bus monitor circuit according to claim 1, wherein the controller:
    sequentially stores the access information, transmitted on the bus from the master to the slave, in the first FIFO while sequentially storing write data, transmitted at a same timing as the access information, in the first FIFO;
    sequentially stores read data, which is sent back on the bus from the slave to the master, in the second FIFO;
    controls the first FIFO to output the access information and the corresponding write data when the attribute of the access information stored at the header of the first FIFO indicates the write access;

when the attribute of the access information stored at the header of the first FIFO indicates the read access, waits for the output enable state to be established with the second FIFO, and then controls the first FIFO to output the access information while controlling the second FIFO to output read data.

3. The bus monitor circuit according to claim 1, further comprising a third FIFO that operates at a timing different from timings of the first FIFO and the second FIFO, wherein the controller:
sequentially stores the access information, transmitted on the bus in a direction from the master to the slave, in the first FIFO;
sequentially stores write data, transmitted on the bus in the direction from the master to the slave, in the third FIFO;
sequentially stores read data, which is sent back on the bus in a direction from the slave to the master, in the second FIFO;
when the attribute of the access information stored at the header of the first FIFO indicates the write access, waits for an output enable state of the third FIFO outputting write data, and then controls the third FIFO to output write data while controlling the first FIFO to output the access information;
when the attribute of the access information stored at the header of the first FIFO indicates the read access, waits for an output enable state of the second FIFO outputting read data, and then controls the second FIFO to output read data while controlling the first FIFO to output the access information.

4. The bus monitor circuit according to claim 1, wherein upon detecting an overflow of the first FIFO, the controller notifies an erroneous condition using an error flag bit while outputting the access information, which is stored at the header of the first FIFO but disappears due to the overflow, together with the error flag bit.

5. The bus monitor circuit according to claim 1, further comprising:
a delay part that latches a bus monitor output signal;
an address comparator that determines, through comparison, whether or not temporally fore-and-aft bus access data indicate accessing to incremental addresses; and
an address information selector that shares an address portion of the bus monitor output signal in use as a data portion.

6. The bus monitor circuit according to claim 1, further comprising:
a delay part that latches the bus monitor output signal;
an address comparator that determines, through comparison, whether or not upper bits of addresses specified by temporally fore-and-aft bus access data match with each other; and
a data information selector that shares a data portion of the bus monitor output signal in use as upper bits of an address.

7. The bus monitor circuit according to claim 1, wherein time stamp information is added at a timing of storing the access information in the first FIFO.

8. The bus monitor circuit according to claim 1, wherein each of the first and second FIFO is non-empty.

9. The bus monitor circuit according to claim 8, wherein the output enable state represents a condition in which each FIFO is non-empty.

10. The bus monitor circuit according to claim 1, wherein each of the first and second FIFO includes data stored therein.

11. The bus monitor circuit according to claim 10, wherein the output enable state represents a condition in which each FIFO includes data stored therein.

12. The bus monitor circuit according to claim 1, wherein each of the first and second FIFO is ready to output data stored therein.

13. The bus monitor circuit according to claim 12, wherein the output enable state represents a condition in which each FIFO is ready to output stored data therein.

14. A bus monitor method that produces a bus monitor output signal on a bus transmitting data between a master and a slave by use of a first FIFO and a second FIFO which operate at different timings, said bus monitor method comprising:
sequentially storing access information corresponding to an occurrence order of bus accesses for both read and write accesses, transmitted on the bus in a direction from the master to the slave, in the first FIFO;
waiting for an output enable state to be established with the first FIFO or the second FIFO, and then controlling the first FIFO or the second FIFO to output write data or read data in response to a write access or a read access specified by an attribute of the access information stored at a header of the first FIFO while controlling the first FIFO to output the access information; and
selecting write data or read data in accordance with the attribute of the access information stored at the header of the first FIFO, thus outputting the selected data paired with the access information in a same cycle.

15. The bus monitor method according to claim 14, wherein the sequentially storing comprises:
sequentially storing the access information, transmitted on the bus from the master to the slave, in the first FIFO while sequentially storing write data, transmitted at a same timing as the access information, in the first FIFO; and
sequentially storing read data, which is sent back on the bus from the slave to the master, in the second FIFO, and
wherein the controlling comprises:
controlling the first FIFO to output the access information and the corresponding write data when the attribute of the access information stored at the header of the first FIFO indicates the write access; and
when the attribute of the access information stored at the header of the first FIFO indicates the read access, waiting for the output enable state to be established with the second FIFO, and then controlling the first FIFO to output the access information while controlling the second FIFO to output read data.

16. The bus monitor method according to claim 14, further comprising providing a third FIFO that operates at a timing different from timings of the first FIFO and the second FIFO, wherein the sequentially storing comprises:
sequentially storing the access information, transmitted on the bus in a direction from the master to the slave, in the first FIFO;
sequentially storing write data, transmitted on the bus in the direction from the master to the slave, in the third FIFO; and
sequentially storing read data, which is sent back on the bus in a direction from the slave to the master, in the second FIFO,
wherein the controlling comprises:
when the attribute of the access information stored at the header of the first FIFO indicates the write access, waiting for an output enable state of the third FIFO outputting write data, and then controlling the third FIFO to output write data while controlling the first FIFO to output the access information; and when the attribute of the access information stored at the header of the first FIFO indicates the read access, waiting for an output enable state of the second FIFO outputting read data, and then controlling the second FIFO to output read data while controlling the first FIFO to output the access information.

17. The bus monitor method according to claim 14, wherein upon detecting an overflow of the first FIFO, notifying an erroneous condition using an error flag bit while outputting the access information, which is stored at the header of the first FIFO but disappears due to the overflow, together with the error flag bit.

18. The bus monitor method according to claim 14, further comprising:

latching, by a delay part, a bus monitor output signal;

determining, by an address comparator, through comparison, whether or not temporally fore-and-aft bus access data indicate accessing to incremental addresses; and sharing, by an address information selector, an address portion of the bus monitor output signal in use as a data portion.

19. The bus monitor method according to claim 14, further comprising:

latching, by a delay part, the bus monitor output signal;

determining, by an address comparator, through comparison, whether or not upper bits of addresses specified by temporally fore-and-aft bus access data match with each other; and sharing, by a data information selector, a data portion of the bus monitor output signal in use as upper bits of an address.

20. The bus monitor method according to claim 14, further comprising adding time stamp information at a timing of storing the access information in the first FIFO.

* * * * *